US012648568B2

(12) United States Patent
Marelli et al.

(10) Patent No.: US 12,648,568 B2
(45) Date of Patent: Jun. 9, 2026

(54) BIOMATERIAL-BASED COMPOSITIONS TO DELIVER PLANT GROWTH PROMOTING MICROBES

(71) Applicant: MASSACHUSETTS INSTITUTE OF TECHNOLOGY, Cambridge, MA (US)

(72) Inventors: Benedetto Marelli, Lexington, MA (US); Augustine Zvinavashe, Harare (ZW)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 780 days.

(21) Appl. No.: 17/770,739

(22) PCT Filed: Oct. 21, 2020

(86) PCT No.: PCT/US2020/056551
§ 371 (c)(1),
(2) Date: Apr. 21, 2022

(87) PCT Pub. No.: WO2021/081018
PCT Pub. Date: Apr. 29, 2021

(65) Prior Publication Data
US 2022/0378048 A1      Dec. 1, 2022

Related U.S. Application Data

(60) Provisional application No. 63/036,088, filed on Jun. 8, 2020, provisional application No. 62/924,483, filed on Oct. 22, 2019.

(51) Int. Cl.
*A01N 63/14*          (2020.01)
*A01C 1/06*           (2006.01)
(Continued)

(52) U.S. Cl.
CPC .............. *A01N 63/20* (2020.01); *A01N 25/00* (2013.01)

(58) Field of Classification Search
CPC ........ A01N 33/12; A01N 25/16; A01N 37/46; A01N 37/52; A01N 33/04; A01N 31/06; A01N 63/14; A01C 1/06; C09D 105/00
See application file for complete search history.

(56) References Cited

U.S. PATENT DOCUMENTS

2003/0224936 A1 † 12/2003 Kretzschmar
2015/0111308 A1    4/2015 Yu et al.
(Continued)

FOREIGN PATENT DOCUMENTS

JP          3566144 B2 * 9/2004
JP      2011201800 A1   10/2011
(Continued)

OTHER PUBLICATIONS

Hungria et al. (Isolation and characterization of new efficient and competitive bean (*Phaseolus vulgaris* L.) rhizobia from Brazil, Soil Biology and Biochemistry 32 (2000), p. 1515-1528) (Year: 2000).*
(Continued)

*Primary Examiner* — Bethany P Barham
*Assistant Examiner* — Danielle Johnson
(74) *Attorney, Agent, or Firm* — MCDONNELL BOEHNEN HULBERT & BERGHOFF LLP

(57)          ABSTRACT

The use of biological fertilizer combined with microbes can be used instead of herbicides, pesticides and synthetic fertilizers. Silk and trehalose dry films can be used as seed coatings to localize and quantify delivery of plant microbes to mitigate plant stress and soil salinity. Similar microbes can be delivered using the same technology.

14 Claims, 22 Drawing Sheets

(51) Int. Cl.
$A01N\ 25/00$      (2006.01)
$A01N\ 63/20$      (2020.01)

(56)            References Cited

U.S. PATENT DOCUMENTS

| | | | |
|---|---|---|---|
| 2018/0332845 A1 † | 11/2018 | Duong | |
| 2019/0014787 A1 | 1/2019 | Greenshields et al. | |
| 2019/0045704 A1 † | 2/2019 | Reap | |
| 2019/0124916 A1 | 5/2019 | Tulley | |

FOREIGN PATENT DOCUMENTS

| | | | | |
|---|---|---|---|---|
| WO | 2017087939 A1 | 5/2017 | | |
| WO | WO-2017143130 A1 * | 8/2017 | ............... | A01C 1/06 |
| WO | WO-2019094700 A1 * | 5/2019 | ............ | A01K 67/04 |

OTHER PUBLICATIONS

Zhang et al. "Enhancement of germination and seedling performance of lettuce under high temperature stress by silk fibroin treatments: effects and biochemical changes". 2012, Acta Hortic. 938: 57-61.

Ampomah et al. (2013) The thuEFGKAB Operon ofRhizobia and Agrobacterium tumefaciens Codes for Transport of Trehalose, Maltitol, and Isomers of Sucrose and Their Assimilation through the Formation of Their 3-Keto Derivatives.

Boothby et al. (2017) Tardigrades Use Intrinsically Disordered Proteins to Survive Desiccation. Mol Cell 65(6):975-984.e5.

Bulgarelli et al. (2013) Structure and functions of the bacterial microbiota of plants. Annu Rev Plant Biol 64:807-838.

Crowe et al. (1984) Preservation of membranes in anhydrobiotic organisms: the role of trehalose. Science 223(4637):701-3.

Crowe et al. (1992) Anhydrobiosis. Annu Rev Physiol 54:579-599.

Crowe et al. (1998) The role of vitrification in anhydrobiosis. Annu Rev Physiol 60(1):73-103.

Deaker et al. (2004) Legume seed inoculation technology—a review. Soil Biol Biochem 36(8): 1275-1288.

Fernandez-Aunion et al. (2010) Biosynthesis of compatible solutes in rhizobial strains isolated from Phaseolus vulgaris nodules in Tunisian fields. BMC Microbiol 10:192.

Food and Agriculture Organization of the United Nations (2019) The State of Food Security and Nutrition in the World. http://,vww.fao.org/3/ca5162en/ca5162en.pdf.

Gebbers et al. (2010) Precision agriculture and food security. Science (80-) 327(5967):828-831.

Godfray et al. (2010) Food security: The challenge of feeding 9 billion people. Science (80-) 327(5967):812-818.

Gomiero (2016) Soil degradation, land scarcity and food security: Reviewing a complex challenge. Sustain 8(3): 1-41.

Holland et al. (2019) The Biomedical Use of Silk: Past, Present, Future. Adv Healthc Mater 8(1):1800465.

Hu et al. (2011) Regulation of Silk Material Structure by Temperature-Controlled Water Vapor Annealing. Biomacromolecules 12(5): 1686-1696.

Hungria et al. (2000) Isolation and characterization of new efficient and competitivebean (Phaseolus vulgaris L.) rhizobia from Brazil. Soil Biol Biochem 32(11):1515-1528.

Hungria et al. (2003) Benefits of inoculation of the common bean (Phaseolus vulgaris) crop with efficient and competitive Rhizobium tropici strains. Biol Fertil Soils 39(2):88-93.

Jain et al. (2009) Effect oftrehalose on protein structure. Protein Sci 18(1):24-36.

Jin et al. (2003) Mechanism of silk processing in insects and spiders. Nature 424(6952): 1057-1061.

Kluge et al. (2016) Silk-based blood stabilization for diagnostics. Proc Natl Acad Sci 113(21):5892 LP-5897.

Lerbret et al. (2005) How Homogeneous Are the Trehalose, Maltose, and Sucrose Water Solutions? An Insight from Molecular Dynamics Simulations. J Phys Chem B 109(21): 11046-11057.

Li et al. (2015) Silk-based stabilization of biomacromolecules. J Control Release 219:416-430.

Lugtenberg et al. (2009) Plant-growth-promoting rhizobacteria. Annu Rev Microbiol 63:541-556.

Malusa et al. (2014) A contribution to set a legal framework for biofertilisers. Appl Microbial Biotechnol 98(15):6599-6607.

Marelli et al. (2016) Silk Fibroin as Edible Coating for Perishable Food Preservation. Sci Rep 6.

Martinez-Romero et al. (1991) Rhizobium tropici, a Novel Species Nodulating Phaseolus vulgaris L. Beans and Leucaena sp. Trees. Int J Syst Evol Microbiol 41(3):417-426.

Matsumoto et al. (2008) Silk Fibroin Solution Properties Related to Assembly and Structure. Macromol Biosci 8( 11):1006-1018.

O'Callaghan et al. (2016) Microbial inoculation of seed for improved crop performance: issues and opportunities. Appl Microbial Biotechnol 100(13):5729-5746.

Ohtake et al. (2011) Trehalose: Current Use and Future Applications. J Pharm Sci 100(6):2020-2053.

Omenetto et al. (2010) New Opportunities for an Ancient Material. Science (80-) 329 (5991):528 LP-531.

Pedrini et al. (2017) Seed Coating: Science or Marketing Spin? Trends Plant Sci 22(2):106-116.

Pritchard et al. (2011) Silk fibroin biomaterials for controlled release drug delivery. Expert Opin Drug Deliv 8(6):797-811.

Reina-Bueno et al. (2012) Role oftrehalose in heat and desiccation tolerance in the soil bacterium Rhizobium etli. BMC Microbial 12:207.

Rockwood et al. (2011) Materials fabrication from Bombyx mori silk fibroin. Nat Protoc 6(10):1612-1631.

Sharma et al. (2013) Phosphate solubilizing microbes: Sustainable approach for managing phosphorus deficiency in agricultural soils. Springerplus 2(1).

Tao et al. (2015) Inkjet Printing of Regenerated Silk Fibroin: From Printable Forms to Printable Functions. Adv Mater 27(29).

Taylor et al. (1998) Seed enhancements. Seed Sci Res 8(2):245-256.

Tseng et al. (2017) Directed assembly of bio-inspired hierarchical materials with controlled nanofibrillar architectures. Nat Nanotechnol 12(5).

Vessey (2003) Plant growih promoting rhizobacteria as biofertilizers. Plant Soil 55(2):571-586.

Vriezen et al. (2007) Responses of Rhizobia to Desiccation in Relation to Osmotic Stress, Oxygen, and Temperature. Appl EnvironMicrobiol 73(11):3451 LP-3459.

Vriezen et al. (2012) Desiccation induces viable but Non-Culturable cells in Sinorhizobium meliloti 1021. AMB Express 2(1):6.

Wenk et al. (2011) Silk fibroin as a vehicle for drug delivery applications. J Control Release 150(2): 128-141.

Williams et al. (2005) Mechanical properties of foods used in experimental studies of primate masticat0 1y function. Am J Primatol 67(3):329-346.

Zaidi et al. (2015) Role of plant growth promoting rhizobacteria in sustainable production of vegetables: Current perspective. Sci Hortic (Amsterdam) 193:231-239.

Zhou et al. (2018) Engineering the Future of Silk Materials through Advanced Manufacturing. Adv Mater 30(33):1706983.

International Search Report (ISR) with Written Opinion for PCT/US2020/056551 dated Feb. 1, 2021, pp. 1-12.

Zhang et al. "Enhancement of Germination and Seedling Performance of Lettuce Under High Temperature Stress by Silk Fibroin Treatments: Effects and Biochemical Changes" International Horticultural Congress on Science and Horticulture for People (IHC2010): international Symposium on Environmental, Edaphic, and Genetic Factors Affecting Plants, Seeds and Turfgrass (2010): abstract.

Singh "Plant Growth Promoting Rhizobacteria Potential Microbes for Sustainable Agriculture" Resonance (Mar. 2013) vol. 18, pp. 1-7; table 1.

Zvinavashe et al. "A bioinspired approach to engineer seed microenvironment to boost germination and mitigate soil salinity" PNAS, vol. 116 Issue 51 (Nov. 27, 2019): pp. 25555?25561; entire document.

Sonjan et al. "Biodegradable Hydrophilic Film of Crosslinked PVA/Silk Sericin for Seed Coating: The Effect of Crosslinker

(56)  References Cited

OTHER PUBLICATIONS

Loading and Polymer Concentration" Journal of Polymers and the Environment, vol. 99 (Sep. 16, 2020): pp. 1-12; entire document.

Kaushik J, Bhat R. Why Is Trehalose an Exceptional Protein Stabilizer? Journal of Biological Chemistry, 2003; 278, 26458-26465.

Zhang et al., Enhancement of Germination and Seedling Performance of Lettuce under High Temperature Stress by Silk Fibroin Treatments: Effects and Biochemical Changes, Proc. XXVIIIt IHC-IS on Envtl. Edaphic & Gen. Factors Affecting Plants, Seeds and Turfgrass, Eds. G.E. Welbaum et al., Acta Hort. 938, ISHS 2012, pp. 57-62.†

* cited by examiner
† cited by third party no coat    dip coat silk    dip coat silk + R.tropici    spray coat silk + R.tropici

E

F

| Material | C. A (º) | μ (Pa.S) @ 100 1/s |
|---|---|---|
| Silk | 12.9 ± 0.1 | $5.2*10^{-3}$ |
| SC(3:1) | 12.6 ± 0.3 | $3.5*10^{-3}$ |
| SC(1:1) | 11.3 ± 0.8 | $2.7*10^{-3}$ |
| SC(1:3) | 7.3 ± 0.5 | $2.2*10^{-3}$ |
| Sucrose | 5.0 ± 0.3 | $1.5*10^{-3}$ |

A

| Material | C. A (º) | μ (Pa.s) @ 1/100 1/s | Thickness (mm) |
|----------|----------|---------------------|----------------|
| Silk | 15.9 ± 0.1 | $5.2*10^{-3}$ | 0.118 ± 0.004 |
| ST(3:1) | 12.9 ± 0.3 | $3.6*10^{-3}$ | 0.125 ± 0.006 |
| ST(1:1) | 10.7 ± 0.2 | $3.0*10^{-3}$ | 0.123 ± 0.005 |
| ST(1:3) | 7.9 ± 1.0 | $2.2*10^{-3}$ | 0.116 ± 0.003 |
| Trehalose | 4.7 ± 1.0 | $1.2*10^{-3}$ | N/A |

Mechanism

Silk-trehalose base layer preserves
microbes in a dry state

Pectin/CMC layer resuscitates microbes
and improves germination in dry arid
conditions

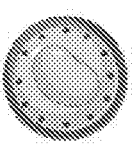

■■ Hydrogel
▨▨ Silk/trehalose
▧ Seed
▴ Rhizobacteria

1. Superabsorbent hydrogel (SAH) absorbs water to hydrate and initiate germination 2. Microbe base coating dissolves and microbes diffusive into superabsorbent hydrogel layer 3. Sugars in SAH provide nutrients for resuscitation and proliferation. Gradual localized controlled microbe release 4. Seed releases exudates to chemoattract rhizobium tropici 5. Root and Cortex tissues are colonized by microbes 6. Coating gradually biodegrades and is penetrated by root system

BIOMATERIAL-BASED COMPOSITIONS TO DELIVER PLANT GROWTH PROMOTING MICROBES

RELATED APPLICATIONS

This application is a U.S. National Phase of International Application No. PCT/US2020/056551, filed Oct. 21, 2020, which claims priority to U.S. Provisional Application No. U.S. 63/036,088, filed Jun. 8, 2020 and U.S. Provisional Application No. 62/924,483, filed Oct. 22, 2019, all of which are incorporated by reference herein in their entirety.

BACKGROUND

In a world that strives to accommodate population growth and changes in climate patterns, there is a compelling need to develop new technologies to enhance agricultural output while minimizing inputs and mitigating their effects on the environment. Growth of human population, soil degradation and misuse of agrochemicals are the main challenges that agriculture needs to face in the next decades to address the increasing demand in global food production. In this scenario, seed enhancement technologies will play a pivotal role in supporting food security by enabling germination of seeds in degraded environments, boost of yields and reduction of germination time. So far, a great effort has been pursued in designing plants that can adapt to different environments and germinate in the presence of abiotic stressors like soil salinity, heat and drought. The technology described herein addresses food security by engineering the microenvironment of seeds by encapsulating, preserving and precisely delivering biofertilizers that can boost seed germination and mitigate abiotic stressors.

Global food production is projected to rise in the next decades to provide support to 800 million people that are currently living outside food security and to cope with a projected 9.7 billion people population by 2050 (1). Concurrently, land degradation, excessive freshwater consumption and misuse of agrochemicals cause inefficiencies in agricultural practices, while changes in climate patterns and spread of transboundary pests and diseases require rapid crop adaptation to abiotic and biotic stressors. To answer to all these challenges, precision agriculture has emerged as the use of advanced technologies to make food production more efficient, with the main goal of increasing crop production while minimizing inputs such as water and agrochemicals and mitigating environmental impact (2-4). As a result, agriculture is becoming increasingly technological and more sustainable with big data analysis, geolocalization, modernization of mechanical equipment and sensing systems being the main drivers of innovation in a sector that in the past years has mostly benefited from improvements in agrochemical formulations, weather prediction, breeding and seed engineering.

Seeds are the agricultural product with the most value added and not only represent a source of food, but also the most important resource in agricultural practices (5). There are many reasons for seedling suboptimal germination and mortality including diseases, pests, excessive use of fertilizers in the seed row, improper seeding depth, osmotic stress, frost and drought (6). The use of precision tools to manage seed sowing and to support germination is then paramount to guarantee efficiency in terms of output over space. In the last few years, seed enhancement technologies have emerged to improve seed performance by exposure to specific conditioning and regimes (7). Seed coatings have been developed to control seed surface properties, locally enrich the soil with nutrients and influence seed water uptake (5, 8). However, the attention has mostly been focused on the investigation of payloads used to boost seed germination as a function of soil properties and seed type, rather than on the materials used to encapsulate and deliver the payloads. This approach has limited the formulation of seed coatings that encapsulate beneficial but labile compounds such as biofertilizers, i.e. plant growth promoting rhizobacteria (PGPRs) that increase availability of nutrients and phytohormones during interaction with plant roots while mitigating the environmental side-effects of synthetic fertilizers and pesticides (9-11). The incorporation of inocula in an artificial seed coat can result, in fact, in the loss of microbial viability, with coated seeds unable to be stored for extended periods (12). The synthetic seed coat is usually a hostile environment for the PGPRs, mostly due to osmotic and desiccation stress and, when protectant compounds are present, their biological activity could pose a threat to the survival of symbiotic bacteria. Biomaterials that are adopted from the field of drug delivery represent a technological opportunity to develop an advanced seed coating technology that combines biodegradation with encapsulation, preservation and controlled release of payloads that can boost seed germination and mitigate stressors.

Described herein is a biomaterial based approach to engineer the microenvironment of seeds through the preservation and delivery of plant growth promoting rhizobacteria (PGPRs) that are able to fix nitrogen and mitigate soil salinity. PGPRs are encapsulated in silk-trehalose coatings that provides merits of bacterial preservation and delivery upon sowing. Biomaterial choice is inspired by a recent finding that a combination of proteins and disaccharides is key for anhydrobiosis. This technology is effective to boost seed germination and mitigate soil salinity.

SUMMARY

This Summary introduces a selection of concepts in simplified form that are described further below in the Detailed Description. This Summary neither identifies key or essential features, nor limits the scope, of the claimed subject matter.

Described herein is a biomaterial based seed coating composition comprising a structural protein and a disaccharide that can be mixed with plant growth promoting rhizobacteria (PGPRs) and applied on the surface of seeds, retrofitting currently used techniques for seed coating, i.e. dip coating or spray drying. A micrometer thick, transparent, robust coating is formed by material assembly. The combination of a polymorphic protein and of a disaccharide used by living systems to tolerate abiotic stressors provides a beneficial environment for the survival of non-spore forming rhizobacteria outside the soil and in anhydrous conditions. Rhizobacteria which are delivered in the soil through coating degradation infect seedlings' roots, form root nodules, enhance yield, boost germination and mitigate soil salinity. In specific embodiments, the bacteria includes *Rhizobium tropici* CIAT 899 and *Phaseolus vulgaris*.

The presently described biomaterial seed coatings use plant microbes as a biological fertilizer as a substitute for the previous plant growth benefits of herbicides, pesticides and synthetic fertilizers. The use of silk and trehalose dry films as seed coatings can be used to localize and quantify delivery of plant microbes that can mitigate plant stress, and soil salinity. A number of different types of microbes can be delivered using the same technology.

The invention provides a bilayer biopolymer reservoir for microbe proliferation. By engineering a microenvironment for microbe growth, microbe reservoirs/generators have been designed that increase infecting microbe quantities and health. Using a seed coating described herein to preserve microbes, a microbe protectant was further developed. A pectin/CMC hydrogel was synthesized and is used to coat the structural protein and disaccharide initial microbe layer. The hydrogel works as a medium for microbe growth and proliferation. The hydrogel layer consequently provides moisture that can be used to alleviate water stress during early seedling growth.

The following Detailed Description references the accompanying drawings which form a part this application, and which show, by way of illustration, specific example implementations. Other implementations may be made without departing from the scope of the disclosure.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 (including FIG. 1A, FIG. 1B, FIG. 1C, FIG. 1D and FIG. 1E) illustrates the characterization of silk fibroin, trehalose and their mixtures used to manufacture films for seed coating.

FIG. 2 (including FIG. 2A, FIG. 2B, FIG. 2C, and FIG. 2D) illustrates coating manufacturing, inoculant encapsulation and material degradation.

FIG. 4 (including FIG. 4A and FIG. 4B) illustrates the interplay between trehalose and CIAT 899.

FIG. 5 (including FIG. 5A, FIG. 5B, and FIG. 5C) illustrates seed coating, plant root colonization and mitigation of saline soil environment.

FIG. 7 (including FIG. 7A, FIG. 7B, FIG. 7C, FIG. 7D, FIG. 7E, and FIG. 7F) illustrates a physical analysis of dried silk film, sucrose film and their mixture films.

FIG. 8 (including FIG. 8A and FIG. 8B) illustrates a physical analysis of dried silk film, trehalose film and their mixture films.

FIG. 9 (including FIG. 9A and FIG. 9B)

FIG. 13 illustrates the mechanism.

DETAILED DESCRIPTION

Figure 1A:
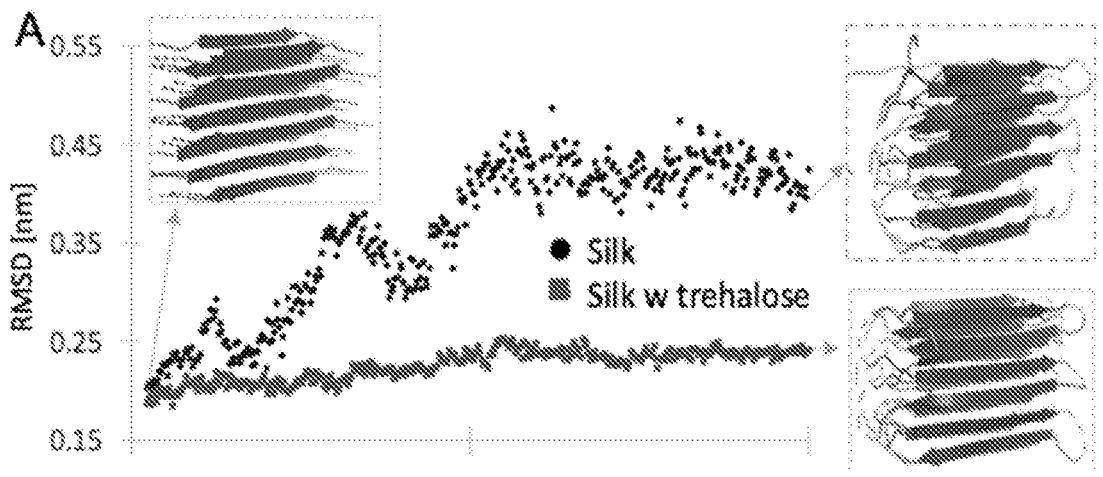
FIG. 1A shows MD simulation of silk fibroin when exposed to water (black dots) and to a water and trehalose solvent-matrix (red dots); root mean squared deviation (RMSD) measures average distance between the atoms. The three inserts depict silk fibroin structure after relaxation and at the end of the simulation (40 ns) in the different media.

Describe herein is a biomaterial-based approach to engineer seed coatings that can boost germination and mitigate abiotic stressors like soil salinity. Presented herein is a biomaterial formulation able to coat seeds with biofertilizers and release them in the soil to boost germination and mitigate soil salinity. The bioinspired approach combines a disaccharide which plays a key role in anhydrobiosis with a structural protein that provides mechanical robustness, ease of fabrication, adhesiveness, conformability and controlled biodegradation.

The present biomaterials can be used for precision agriculture, to enhance food production while minimizing inputs and mitigating environmental impacts. The present biomaterials can be used to engineer the microenvironment of seeds and to precisely deliver nutrients, hormones and beneficial biomolecules to seedlings, paving the way for a more sustainable and effective delivery of fertilizers and pesticides. Seed coating yielded plants that grew faster and stronger in the presence of saline soil.

In particular, the instant biomaterial is based on a combination of a structural protein and a disaccharide. The combination can be mixed with rhizobacteria and applied on the surface of seeds, retrofitting currently used techniques for seed coating, such as dip coating or spray drying.

In some embodiments, the structural protein is a protein composed of a repetitive units that form ordered structures (e.g. beta-sheet) staggered by a non-repetitive region of the amino acid chain that form non-ordered secondary and tertiary structures. In some embodiments, the structural protein is selected from silk fibroin, suckerin, or keratin. In some embodiments, the structural protein is silk fibroin. In some embodiments, the silk fibroin is extracted from *Bombyx mori* cocoons.

Silk fibroin is a structural protein that is well known for its application in textile and that has been reinvented as a naturally-derived technical material with applications in regenerative medicine, drug delivery, implantable optoelectronics and food coating (13, 14). The structural protein is purified from cocoons into a water suspension using a water-based process that uses chaotropic ions as LiBr to break the inter- and intra-molecular hydrogen bonds that crosslink silk fibroin molecules into fibers (15). Upon removal of the ions via dialysis, silk fibroin has the form of nanomicelles in water suspension that are stable for a period of time that ranges from days to months, depending on concentration, pH and molecular weight (16, 17). Material assembly is driven by water removal and formation of new intra- and inter-molecular hydrogen bonds. This process can be engineered to obtain several materials formats, including transparent, robust membranes that have been used to extend the shelf-life of perishable crops (18). The combination of a diblock copolymer-like structure with hydrophobic repetitive amino acid sequences spaced out by hydrophilic, negatively charges non-repetitive sequences make silk fibroin polymorphic as the protein can be obtained in random coil or beta-sheet rich structures, enabling the fabrication of silk materials that are water soluble or water-insoluble, respectively (19, 20). Silk fibroin structure also provides a distinct environment that can preserve labile compounds ranging from antibiotics to growth factors, enzymes and viruses by mitigating oxidative stress, providing sufficient hydration and maintaining biomolecules configuration in anhydrous conditions (21).

In some embodiments, the disaccharide is selected from trehalose, sucrose, lactose, or maltose. In some embodiments, the disaccharide is trehalose.

Trehalose is a nonreducing disaccharide in which the two glucose units are linked via an $\alpha,\alpha$-(1,1)-glycosidic bond. This disaccharide has been isolated from all domains of life including plants, animals, fungi, yeast, archaea, and bacteria (22). Trehalose is also industrially produced as it is used in the food, cosmetics, and pharmaceutical industries. This disaccharide can play important and different roles in cells, such as, as signaling molecule, carbohydrate reserve, and protectant against various stresses (e.g., drought, cold, and salt stress) (23). Accumulation of trehalose occurs both intra- and extra-cellularly (22, 24, 25). There are two competing, but not mutually exclusive, hypotheses about the mechanism of trehalose-driven cellular protection; (i) the vitrification hypothesis suggests that trehalose forms a glass-like matrix within cells, physically preventing protein denaturation, protein aggregation, and membrane fusion, and (ii) the water replacement hypothesis posits that hydrogen bonds between water and cellular components are replaced by trehalose as cells dry, which would also prevent protein denaturation, aggregation, and membrane fusion (26).

Recently, it has been shown that a particular class of proteins known as intrinsically disordered proteins (IDPs) also contributes to anhydrobiosis. For example, a mixture of water-soluble proteins rich in hydrogen bonds and disaccharides is a successful strategy that anhydrobiotic organisms such as tardigrades have developed to survive desiccation (27).

Presented herein is a biomaterial formulation that synergistically uses the coating-forming, payload encapsulation, preservation and biodegradation capabilities of a structural protein with the ability of a disaccharide to protect from osmotic and desiccation stresses in rhizobacteria to develop a seed coating technology that can boost germination and mitigate abiotic stressors like soil salinity.

In some embodiments, biomaterial based seed coating composition comprises a structural protein to disaccharide ratio from about 10:1 to about 1:10. In some embodiments, the ratio of the structural protein to disaccharide is from about 5:1 to about 1:5. In some embodiments, the ratio of the structural protein to disaccharide is from about 3:1 to about 1:3. In some embodiments, the ratio of the structural protein to disaccharide is about 3:1. In some embodiments, the ratio of the structural protein to disaccharide is about 1:1. In some embodiments, the ratio of the structural protein to disaccharide is about 1:3.

The invention further relates to a bilayer biopolymer reservoir for microbe proliferation. By engineering a microenvironment for microbe growth, microbe reservoirs/ generators have been designed that increase infecting microbe quantities and health. Using a seed coating as described herein to preserve microbes, a microbe protectant was further developed. A hydrogel, such as one that comprises pectin, carboxymethyl cellulose (CMC), or a mixture of pectin and CMC, was synthesized and is used to coat the instant structural protein/disaccharide coating initial microbe layer. The hydrogel works as a medium for microbe growth and proliferation. The hydrogel layer consequently provides moisture that can be used to alleviate water stress during early seedling growth.

Formulation of Structural Protein—Disaccharide Biomaterials

Figure 1B:
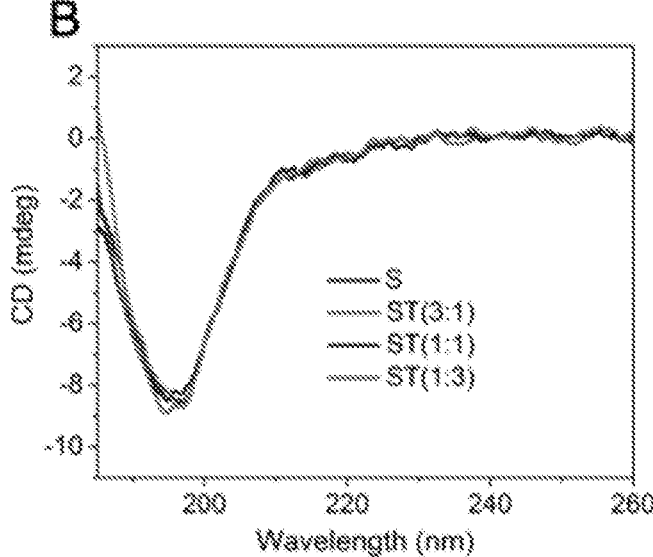
FIG. 1B shows circular dichroism (CD) of suspensions of silk fibroin (S) and mixtures of silk fibroin and trehalose (ST). The disaccharide has no impact on the protein random coil conformation in water suspension.
Figure 1C:
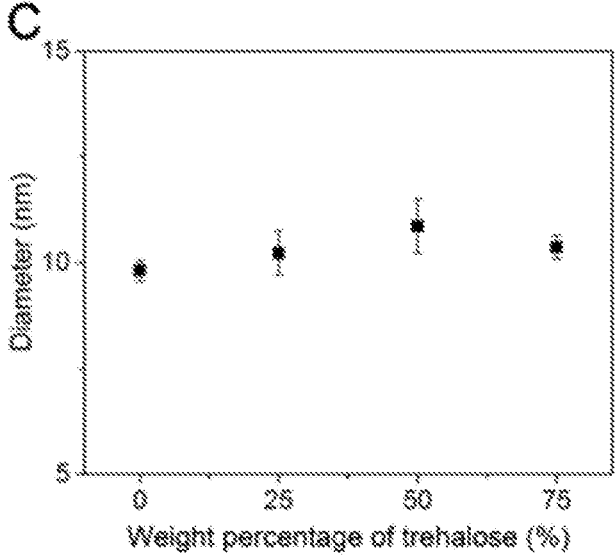
FIG. 1C shows dynamic light scattering (DLS) analysis of silk fibroin nanomicelles aggregation in water as a function of trehalose concentration. The average diameter of silk nanomicelles was not affected by trehalose concentration in the water suspension.
Figure 1D:
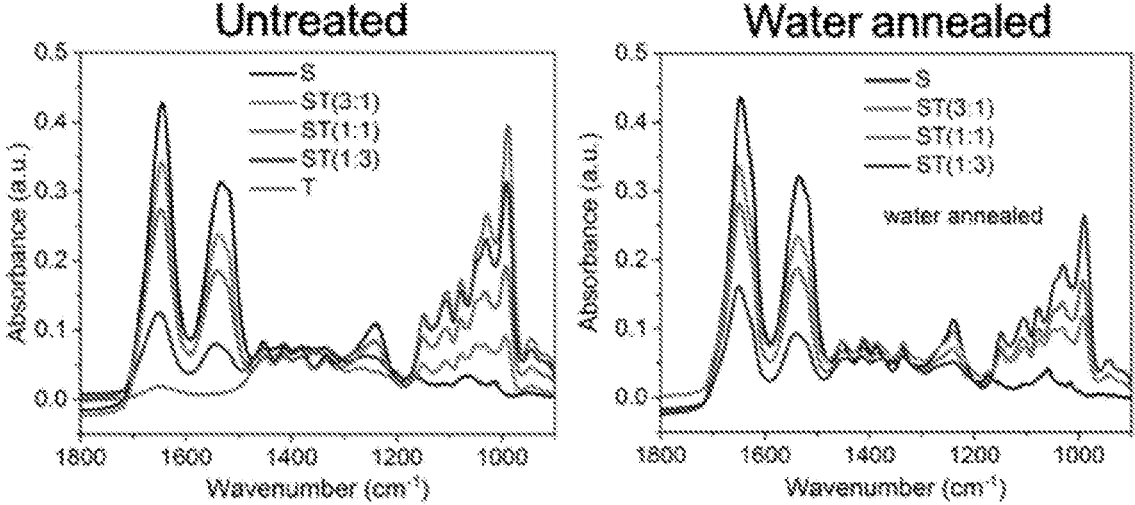
FIG. 1D shows FTIR spectra of films obtained by drop casting of silk fibroin (S), trehalose (T) and their mixtures (ST). The random coil-dominated resonance peaks of the amide bonds in the Amide I and Amide III regions were not affected by the presence of trehalose, indicating that the disaccharide has no effects on the protein polymorphism during the sol-gel-solid transition. In the right panel, FTIR spectra show that a polymorphic random coil to beta sheet transition of silk fibroin can be induced post film formation with water annealing, as evidenced by the appearance of a peak at 1621 cm-1.

Li and co-workers have recently reported how the preservation of biomolecules in silk fibroin formulations correlates with matrix β-relaxation, as it does in sugar-based dry formulations (28). It was also found that inclusion of sugars like sucrose in silk fibroin-based materials enhances the protein stabilizing performance as they can act as antiplasticizers that suppress β-relaxation and decelerate degradation rates. In FIG. 1, the effects of a disaccharide (e.g., trehalose) on structural protein (e.g., silk fibroin) matrices is reported. Molecular dynamic simulations were used to investigate the molecular mobility of a silk fibroin-like system made by 18 (GAGSGA)2 peptides organized in a beta sheet configuration when suspended in water or in a water trehalose mixture (FIG. 1A). Time evaluation of the root-mean-square deviation (RMSD) of atomic position from the original conformation indicated that trehalose reduces the dynamics of the eighteen peptides systems and correlates with the general knowledge that sugars form a matrix around proteins that lock them in the original conformation by slowing down protein dynamics. Trehalose does not interfere with silk fibroin assembly as its addition to silk fibroin suspensions does not impart any modification to the random coil structure assumed by silk fibroin nor it drives protein assembly. Circular dichroism (CD) spectra of silk fibroin (S) and silk fibroin-trehalose (ST) water suspensions depicted that the protein maintained a random coil structure when exposed to increasing concentrations of trehalose, up to 75 dry wt % (FIG. 1B). Dynamic light scattering (DLS) was used to measure the hydrodynamic radius of silk fibroin nanomicelles in S and ST water suspensions (FIG. 1C). No statistically significant difference ($p > 0.05$) was found in the measured nanomicelles diameters at increasing trehalose concentrations, indicating that trehalose does not influence assembly of silk fibroin molecules in water. Attenuated total reflection Fourier transformed infrared spectroscopy (ATRFTIR) was used to evaluate the effects of trehalose on silk fibroin polymorphism upon drying (FIG. 1D). All the spectra of silk fibroin films obtained using an increasing concentration of trehalose had an Amide I resonance centered at 1647 cm-1, indicating that the structure of silk fibroin molecules was not affected by trehalose and possessed a random coil configuration.

Figure 1E:
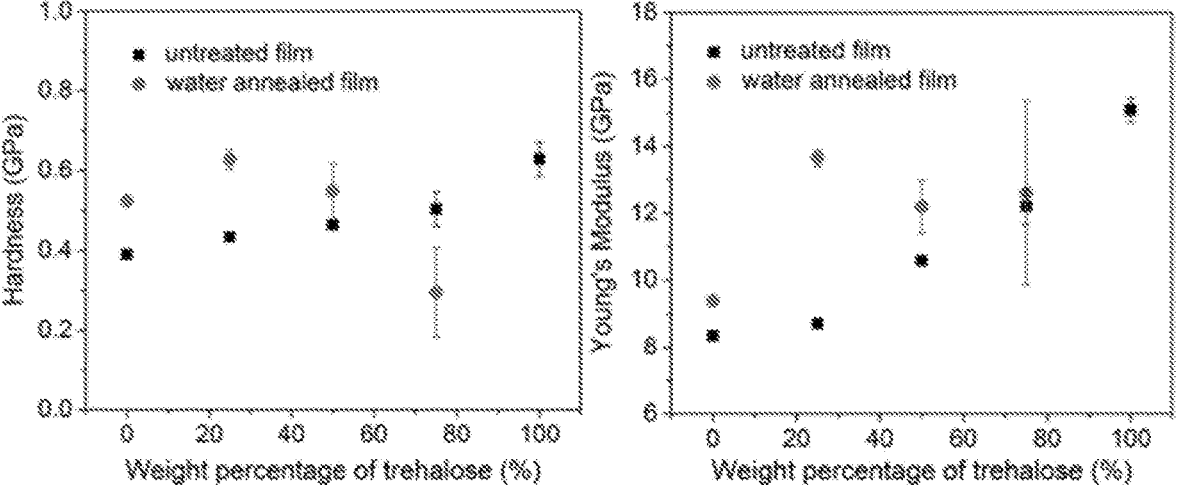
FIG. 1E shows mechanical properties of films composed by silk fibroin, trehalose and their mixtures investigated with nanoindentation. Trehalose concentration and water annealing post-process resulted in an increase in hardness and apparent modulus and in the formation of more brittle films.

Methods such as water annealing that are commonly used to drive the random coil to beta-sheet transition in assembled silk fibroin molecules were still effective in crystallizing silk fibroin at high concentrations of trehalose. This phenomenon suggests that the replacement of hydrogen bonds between silk fibroin molecules and water with inter- and intra-molecular hydrogen bonds may be thermodynamically favorable even in the presence of trehalose and that the protein can undergo structural reconfiguration, water loss and volume change despite the trehalose-induced vitrification of the protein. Nanoindentation mechanical tests conducted on silk fibroin films containing increasing concentrations of trehalose showed that films' hardness and Young modulus increased as the trehalose concentration increased. The inclusion of large quantities (up to 75 wt %) of the disaccharide imparted an antiplasticizing effect, which followed the rule of mixture and resulted in a more brittle final material, especially at trehalose concentrations >50 dry wt % (FIG. 1E). However, when water annealing post-processing was applied to enhance films' beta-sheets content, the hardness and Young modulus of ST materials did not follow the rule of mixture. Hardness increased for trehalose concentrations up to 25 dry wt % (i.e. ST3:1) and then decreased in films with a trehalose content of 50 and 75 dry wt % (i.e. ST1:1 and ST1:3, respectively). Young modulus of ST materials increased for ST3:1 films and then plateaued for larger trehalose contents.

FIG. 7 characterizes films obtained by mixing silk fibroin with sucrose. CD, DLS and ATR-FTIR analyses showed that sucrose did not modify silk fibroin folding and assembly behavior, similarly to what found for trehalose (FIG. 7A-D). However, nanoindentation measurements showed that rule of mixture can predict mechanical properties when sucrose is incorporated in silk fibroin materials, even when water annealing is applied. These data suggest a difference in the effects of vitrification imparted by trehalose and sucrose on silk materials; trehalose possesses higher glass transition temperature ($Tg \approx 393$ K) when compared to sucrose ($Tg \approx 348$ K) and can form a more homogenous network with proteins (26, 29). As a result, the trehalose brittle matrix is disrupted by silk fibroin random coil to beta sheets structural changes during water annealing, yielding a weaker material for trehalose concentrations >25 dry wt %. Nonetheless, ST materials showed mechanical properties in the order of currently available seed coatings (Young modulus of 10-1-101 GPa) (30).

Coating Assembly and Biofertilizer Encapsulation and Release Performance

Figure 2A:
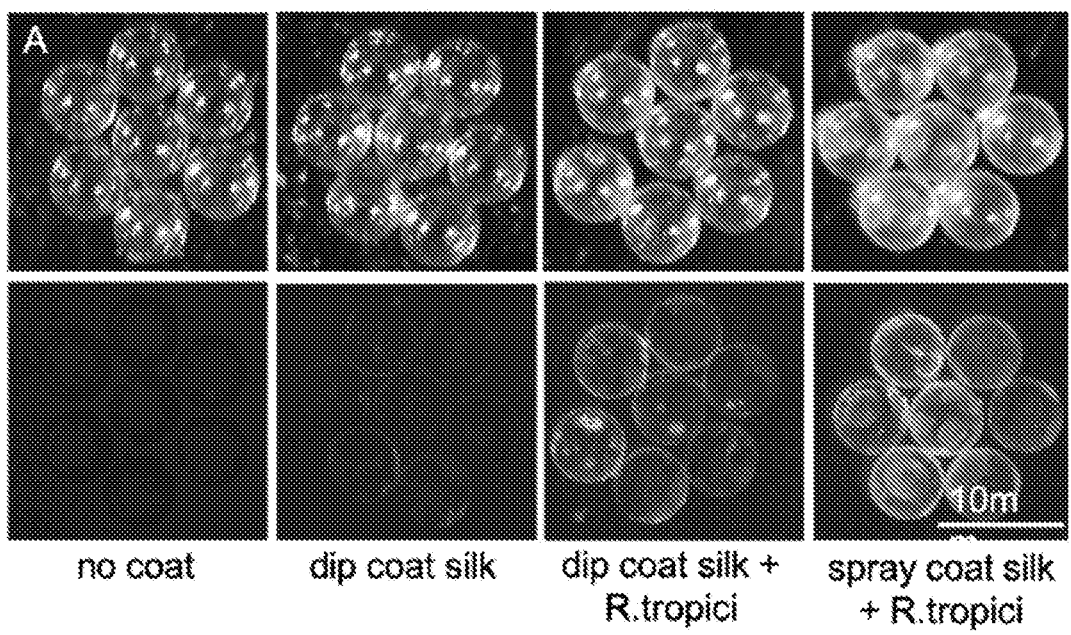
FIG. 2A shows a single-pot coating of glass beads used as seeds phantom with dip coating and spray drying techniques. GFP modified CIAT 899 allowed to visualize bacteria distribution on the glass beads.
Figure 2B:
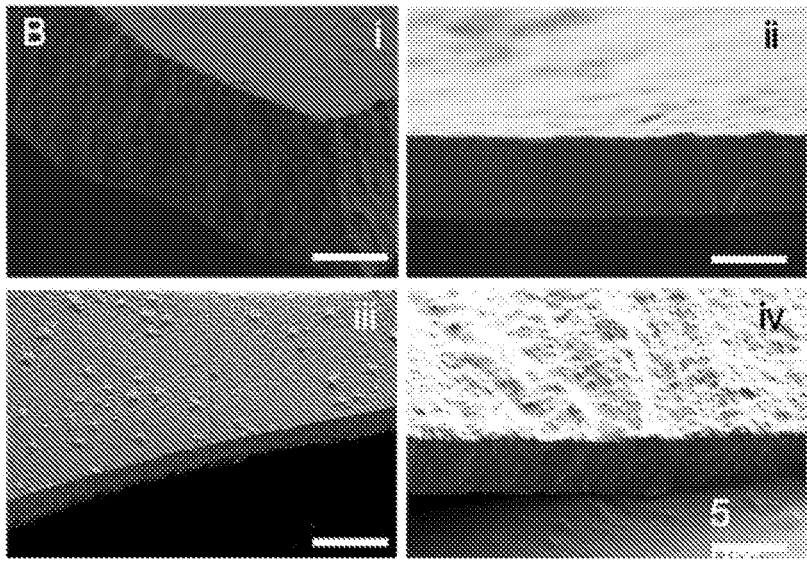
FIG. 2B shows SEM micrographs depicting the cross section of (i) silk (S), (ii) silk-trehalose 3:1 ST(3:1), (iii) ST(1:1), and (iv) ST(1:3) coatings obtained by dip coating. The resulting film thickness was of circa 5 μm.
Figure 2C:
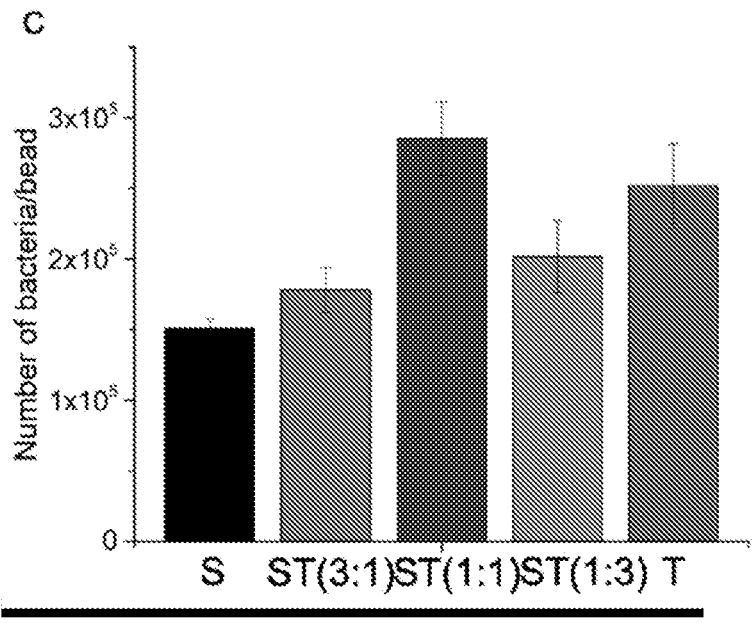
FIG. 2C shows the investigation of bacteria encapsulation efficacy during dip coating process. The quantity of bacteria per bead after dip coating was quantified by colony counting. All coating solutions had similar dry matter concentration, number of bacteria and viscosity.
Figure 2D:
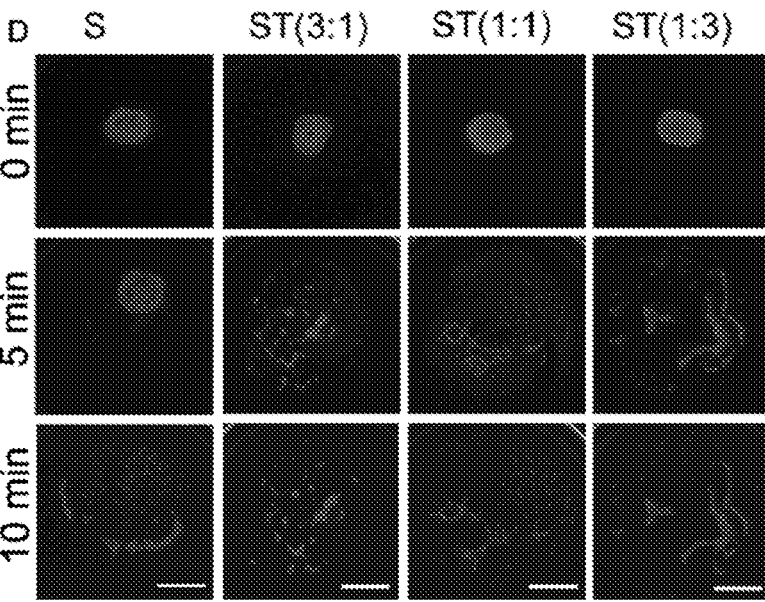
FIG. 2D shows the degradation of coating films encapsulating GFP-CIAT 899. Films were positioned on thin phytagels, which were used as transparent artificial soil. Film degradation was investigated as a function of time. Top views of films transilluminated with fluorescence light were taken using a ChemiDoc MP imaging. Scale bar is 1 cm.
Figures 8A, 8B:
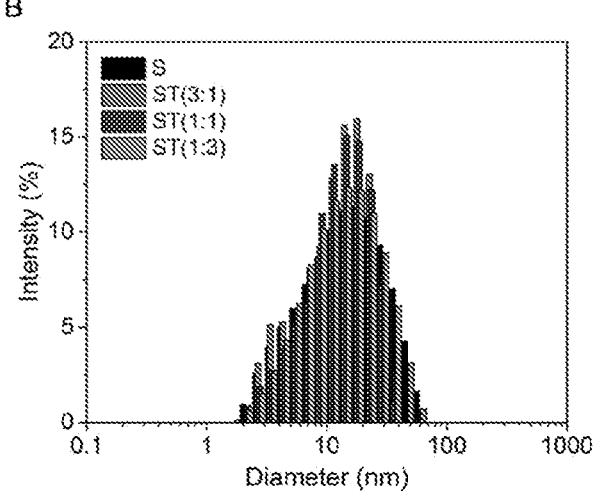
FIG. 8A shows viscosity and contact angle of solutions.
FIG. 8B shows DLS size distribution. S=silk, T=trehalose, ST(3:1)=silk:trehalose=3:1 relative dry weight concentration.
Figure 9A:
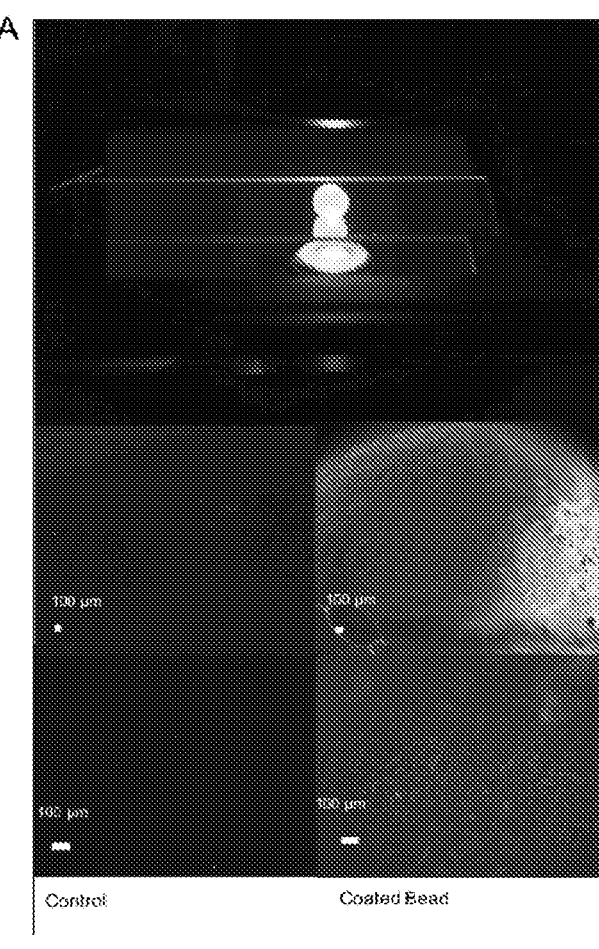
FIG. 9A shows GFP-CIAT 899 coated glass beads setup.
Figure 9B:
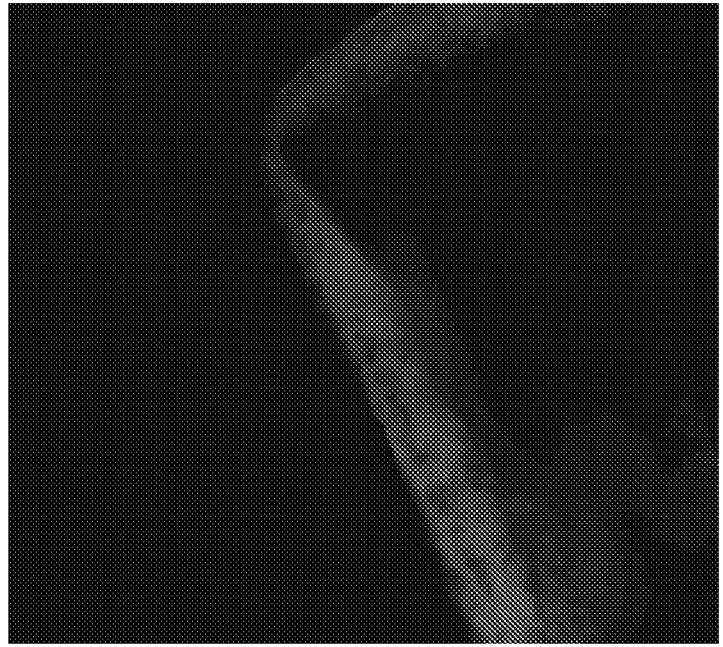
FIG. 9B shows the framework of a video depicting diffusion of CIAT 899 embedded in ST(1:3) films in artificial soil (phytagel).

Silk fibroin assembly is driven by water evaporation and results in a sol-gel-solid transition process that yields a transparent material. The resulting film has a roughness of few nanometers (measured by AFM on flat films) and a thickness that can be controlled by modifying solution rheological parameters (31). At constant solid matter content, inclusion of trehalose in silk fibroin suspensions decreases solution viscosity (FIG. 8), which however remains in the order of $10^{-3}$ Pa·s, thereby enabling the application of ST suspensions on complex geometries such as spheroids by retrofitting existing technologies commonly used for seed coating. Contact angle (q) measurements also showed that q decreases at higher trehalose concentration, given the higher hydrophilicity of the disaccharide when compared to silk fibroin (FIG. 8). When using borosilicate glass beads with a diameter of 5 mm as model for seeds, dip coating and spray drying of ST solutions enabled the encapsulation and delivery of payloads such as PGPRs via formation of a micrometer thick coatings that biodegrade when exposed to water (FIG. 2). Given the transparency of silk materials, green fluorescent protein (GFP)-producing PGPRs such as GFP-modified *Rhizobium tropici* CIAT 899 (GFP-CIAT899) were used to evaluate the encapsulation, preservation and delivery of rhizobacteria. CIAT 899 is a broad host-range rhizobial strain and the most successful symbiont of *Phaseolus vulgaris* (32, 33). CIAT 899 provide high tolerance to environmental stresses such as high temperature, acidity and salinity and as such its use as biofertilizer is highly sought but hindered by the low survivability of the gram-negative bacteria during the desiccation and rehydration steps used for coating formation and inoculation (12, 34). FIG. 2A illustrates fluorescent images of glass beads coated with ST materials using dip coating and spray drying techniques. When compared with the negative controls, it is possible to see how the GFP-CIAT899 were successfully encapsulated in the coating materials as glass beads fluoresced when excited with a blue light. Scanning electron microscopy (SEM) was used to evaluate the thickness of the coatings obtained as a function of increasing relative concentration of trehalose in silk fibroin matrices (i.e. dry mass remained constant). SEM micrographs revealed that coatings thickness was in the order of few micrometers ($5\pm2$ µm) and depicted the presence of bacteria in the vitrified polymeric matrix (FIG. 2B). Successful encapsulation and release of GFP-CIAT 899 on glass beads as a function of ST mixture coating materials (i.e. with increasing relative content of trehalose) was then evaluated via streaking of resuscitated bacteria on an agarose gel using a plate count method (FIG. 2C). Given the coating thickness (t), the spherical geometry of the substrate (r), the known concentration of bacteria in the coating solution (Cb) and assuming an homogenous dispersion of bacteria and the formation of an homogenous coating, it is possible to estimate the number of bacteria encapsulated in the coating (N) by multiplying Cb times the volume of the coating spherical shell (V):

$$N = C_b \cdot V = C_b \cdot \left(\frac{4}{3}\pi R^3 - \frac{4}{3}\pi r^3\right) \approx C_b \cdot \left(4\pi r^2 t\right) \qquad \text{(Eq. 1)}$$

Where R=(r+t) and 4+0.34 is an approximation for the volume of a thin spherical shell obtained as the surface area of the inner sphere multiplied by the thickness t of the shell. Using r=0.25 cm, t=0.0005 cm and Cb=$10^{10}$/cm$^3$, then N≈$3.9\cdot10^6$, which indicated a 1 log reduction of GFP-CIAT 899 culturability during the coating and resuscitation procedures (circa $3\cdot10^5$ CIAT 899 were resuscitated from ST coatings, as shown in FIG. 2C). Using phytagel as a model for soil moisture content close to capacity, ST films biodegradation and release of GFP-CIAT 899 was investigated using a ChemiDoc MP Imaging System. Time laps images of the materials indicated that an increasing relative content of trehalose accelerated material reswelling and structural integrity was loss within 10 minutes. Additionally, fluorescent microscopy images taken on glass beads coated with ST materials encapsulating GFP-CIAT 899 showed bacteria release in phytagel a few minutes after materials got in contact with the artificial soil (FIG. 9).

Preservation of CIAT 899 in Silk Fibroin—Trehalose Coatings

PGPRs like CIAT 899 are non-spore forming bacteria with limited viability outside the soil and do not survive well desiccation (35). Long-term storage of rhizobacteria in seed coating is one of the major bottlenecks that hinders a large-scale use of these biofertilizers in agricultural practice (36, 37).

Application of PGPRs directly in soil and handling of living bacteria involve in fact tools and expertise that are not largely available and thereby the successful encapsulation of PGPRs in seed coatings is seen as a key step to translate the beneficial effects of biofertilizers from bench to field. To assess the potential use of ST materials as seed coating technology to encapsulate, preserve and deliver PGPRs, viability and culturability studies were conducted on CIAT 899 embedded in silk, trehalose and their mixtures at T=23°

Figure 3A:
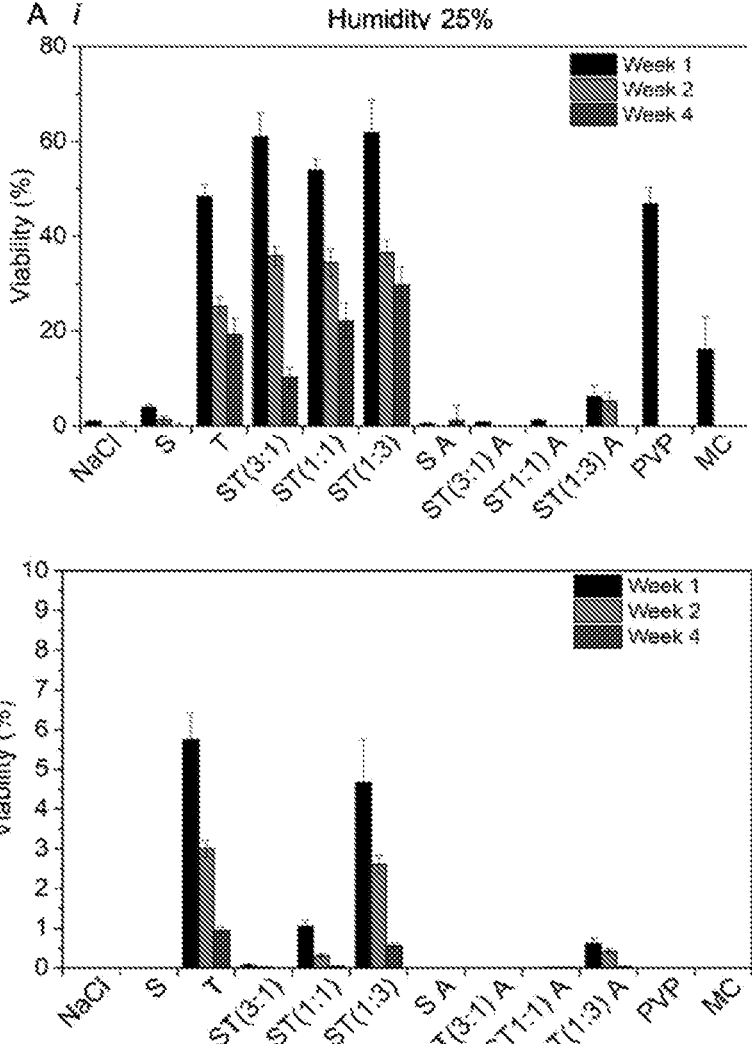
FIG. 3 (including FIG. 3A and FIG. 3B) illustrates the preservation of CIAT 899 in silk, trehalose and their mixtures. Data were collected at weeks 1, 2 and 4 for samples stored at 23° C. and at (FIG. 3A) 25% (FIG. 3B) 50% relative humidity. In the top panels, viability indicates the percentage of bacteria that were metabolically active and had an intact membrane, as investigated by Alamar blue analysis. In the bottom panels, viability was measured as the percentage of bacteria that were culturable into colonies (colony counting analysis). Data are a pooled average±SD of n=7 replicates across ten samples and single factor Anova test. S=silk, T=trehalose, ST=silk:trehalose, x:x indicates the relative weight ratio between the two biopolymers, A=annealed 6 hours, MC=methyl cellulose, PVP=polyvinylpyrrolidone.
Figure 3B:
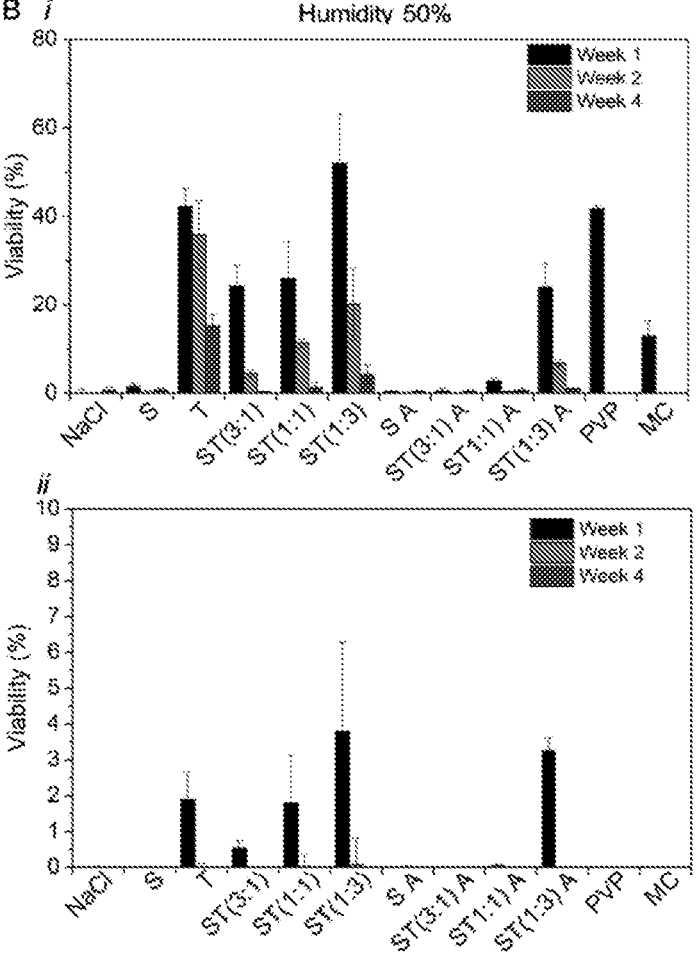
Figure 10:
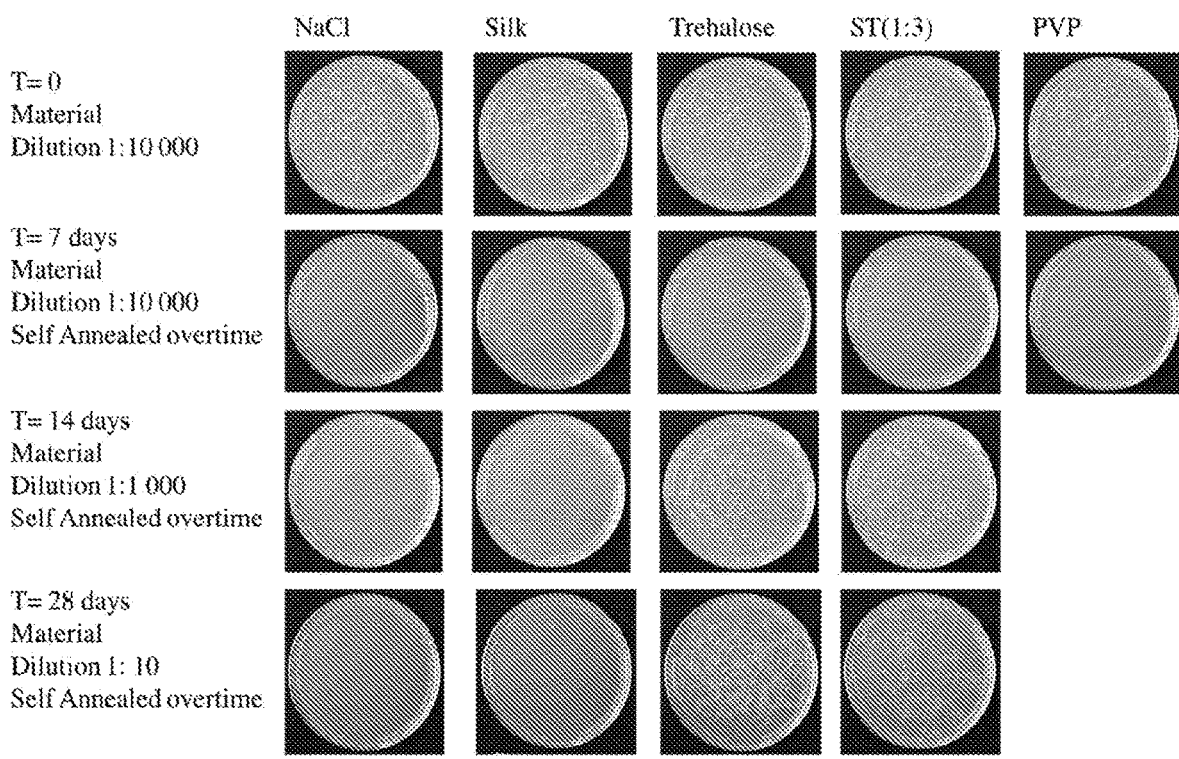
FIG. 10 illustrates selected agar colony counts for stability of CIAT 899 in silk film, trehalose film and their mixture films after storage at 23° C. for 4 weeks at 25% humidity.
Figure 11:
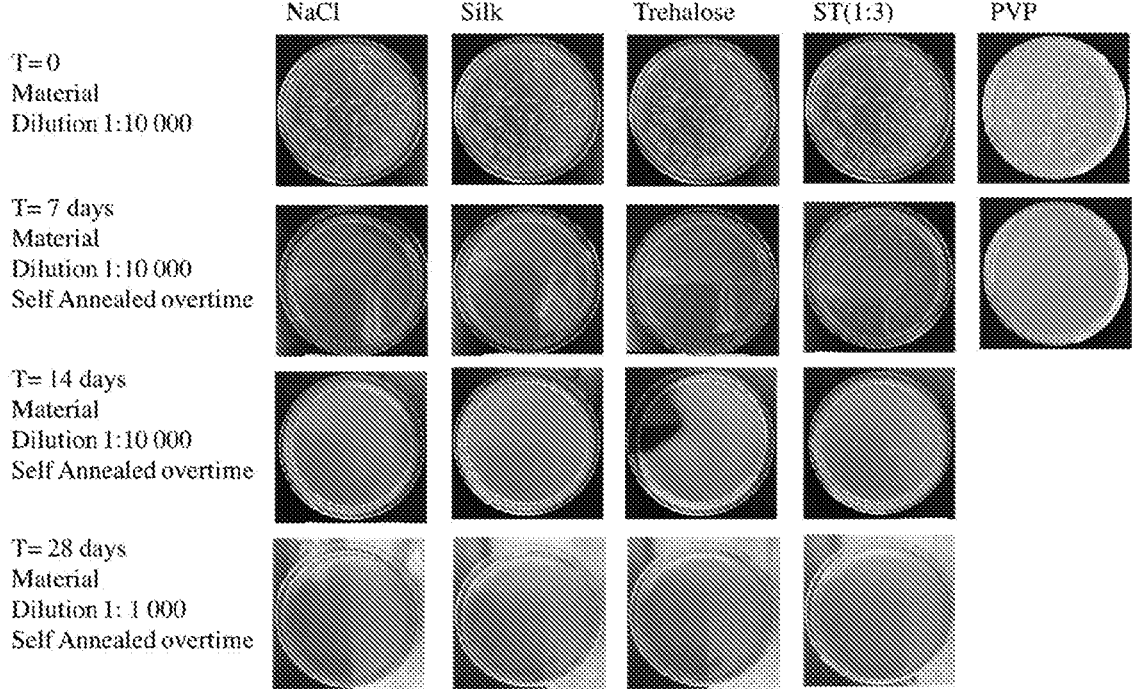
FIG. 11 illustrates selected agar colony counts for stability of CIAT 899 in silk film, trehalose film and their mixture films after storage at 23° C. for 4 weeks at 50% humidity.

C. and relative humidity (RH) of 25% and 50% for up to 4 weeks. GFP-CIAT 899 preserve in sodium chloride and polymers used in commercially available seed coatings as methylcellulose (MC) and polyvinylpyrrolidone (PVP) were used as controls. Storage results are shown in FIG. 3 and indicates that ST materials outperformed silk, trehalose, MC and PVP in preserving GFP-CIAT 899. Interesting, water annealing of silk and ST materials (indicated as A at the end of samples name in FIG. 3) did not enhance preservation, as previously reported for biomolecules such as antibiotics, enzymes and growth factors (38, 39), but appeared to be detrimental. Silk fibroin films anneal into a water insoluble material when left at room conditions and very high RH, as the random coil to beta-sheet transition is thermodynamically favored (40). This process, commonly named water annealing, causes a partial re-hydration and a second drying of the materials which may have stressed and damaged GFP-CIAT899. Viability measurements (FIG. 3 top row) obtained with alamar Blue staining showed that ST(1:3) provided the best environment for GFP-CIAT 899 preservation at both RH levels considered. Particularly, at week 4 post film formation more than 25% of GFP-CIAT 899 encapsulated in ST(1:3) films were found to be metabolically active when preserved at RH=25%. Higher humidity levels decreased viability to circa 5% at week 4, indicating that the coating performance suffers from the hygroscopic nature of the materials used. Alamar Blue was indicative of GFP-CIAT 899 bacteria that were alive (i.e. that metabolized and had an intact membrane) post-resuscitation. However, in order to survive in a competitive environment like the rhizosphere and to form nodules with the host plants, PGPRs need to be able to form colonies. GFPCIAT 899 re-culturability was investigated by striking resuscitated bacteria on agarose gels as a function of storage material, time and RH (FIG. 3 bottom row, FIG. 10 and FIG. 11). A passage in nourishing media was not used to better simulate soil conditions, where no recovery time in media would occur. GFP-CIAT 899 colony counting indicated lower viability levels when compared to results obtained with alamar Blue metabolic activity assay, suggesting that a large quantity of GFP-CIAT 899 were viable but non-culturable (VBNC). VBNC state in PGPRs was previously described as a side effect of desiccation using several encapsulation matrices, including nitrocellulose filters, where viability dropped to 4.0% after one week and to less than 2% after 4 weeks at RH=22% (41). In the presently described experiments, silk, trehalose and ST mixtures provided statistically significantly higher viability than PVP and MC, which are commercially used in seed coating formulations. Additionally, ST(1:3) preserved GFP-CIAT 899 better than other ST mixtures and with similar performance to pure trehalose, indicating that the disaccharide is the key ingredient in the silk fibroin-trehalose mixture to guarantee bacterial re-culturability post-desiccation. Nonetheless, annealing of silk fibroin at the point of material fabrication may be used in the future to delay GFP-CIAT 899 release in the culture medium upon resuscitation to time the protein biodegradation and the consequent release of PGPRs in the environment.

Intrinsic Vs Extrinsic Trehalose

Figure 4A:
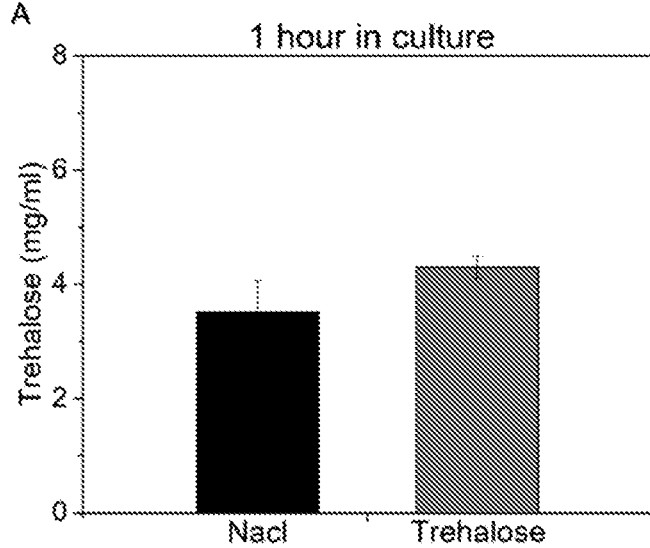
In FIG. 4A bacteria were cultured for 1 hour in 1% dry wt % trehalose solution to measure cellular uptake of extrinsic trehalose. Intrinsic levels of the disaccharide were found to be not statistically significantly different (p>0.05) when compared to the control (0.09 dry wt % NaCl solution). Data are a pooled average±SD of n=7 and single factor Anova test was used.
Figure 4B:
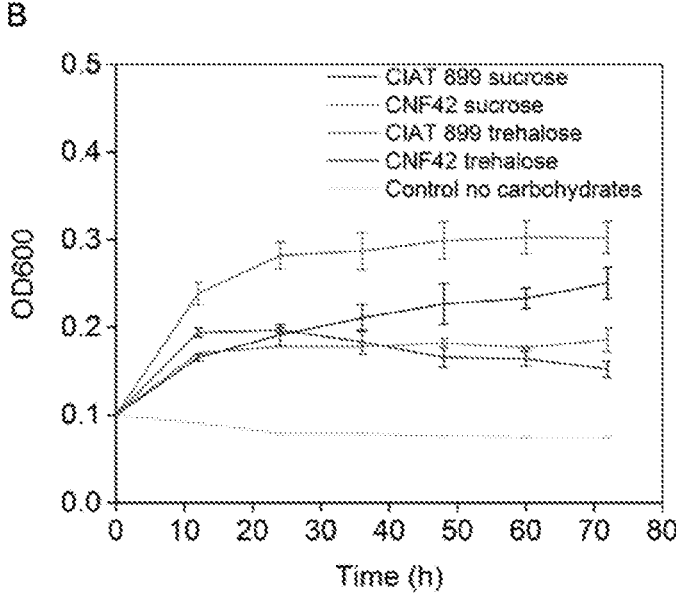
In FIG. 4B CIAT 899 and CNF42 were cultured in 0.4% minimal sucrose solution and 0.4% minimal trehalose solution. Growth profiles of CIAT 899 shows the ability to translocate and metabolize trehalose and to use it as a carbon source. Data are a pooled average±SD of n=7.

Several rhizobium species like *Rhizobium Etli* are reported to synthesize, uptake and degrade trehalose (42). The disaccharide accumulates in the cells as an osmoprotectant in response to increasing osmotic pressure of the medium through the otsAB, treS, and treZY synthetic pathways while internal translocation is regulated by permease proteins like trehalosemaltose ABC transporter, encoded by the trehalose transport and utilization (thu) operon (thuE- FGK) (42). For CIAT 899, it has been reported that trehalose synthesis is osmoregulated (43), suggesting the involvement of trehalose in the osmotolerance of this strain. However, it is still unknown if CIAT 899 has ABC transporter proteins capable of translocating trehalose, as only evidence for a sorbitol/mannitol ABC transporter have been reported (43). To further investigate the mechanism that underpins stabilization of CIAT 899 in ST materials, intrinsic trehalose content for CIAT 899 incubated in a 1 dry wt % trehalose solution and 0.09 dry wt % NaCl solution for 1-hour was measured. The 1-hour time point was used to mimic the amount of time CIAT 899 are in contact with ST materials during solutions handling and coating formation. The study showed that within 1-hour, CIAT 899 intrinsic trehalose concentration was not affected by extrinsic trehalose present in the forming ST materials (FIG. 4A). This finding suggests that the stabilization process induced by ST coatings leverages extracellular phenomena such as vitrification rather than being driven by intracellular translocation of trehalose to provide intrinsic osmotic protection. To further investigate the interplay between extrinsic and intrinsic trehalose in CIAT 899, the ability to translocate and metabolize trehalose was measured when compared to a rhizobium strain such as *Rhizobium etli* CNF42, which is well known to possess the thu operon that can translocate and utilize trehalose (FIG. 4B) (44). The study was conducted by culturing CIAT 899 and CNF42 in minimal media using trehalose as carbon source and sucrose as a positive control. Optical measurements (OD600) showed that CIAT 899 could proliferate in trehalose minimal media as well as CNF42, indicating the ability of CIAT899 to translocate and metabolize trehalose and suggesting that in the future longer pre-exposure to trehalose may lead to enhance preservation performance.

*Phaseolus vulgaris* Germination Boost and Mitigation of Saline Soil Conditions

Figure 5A:
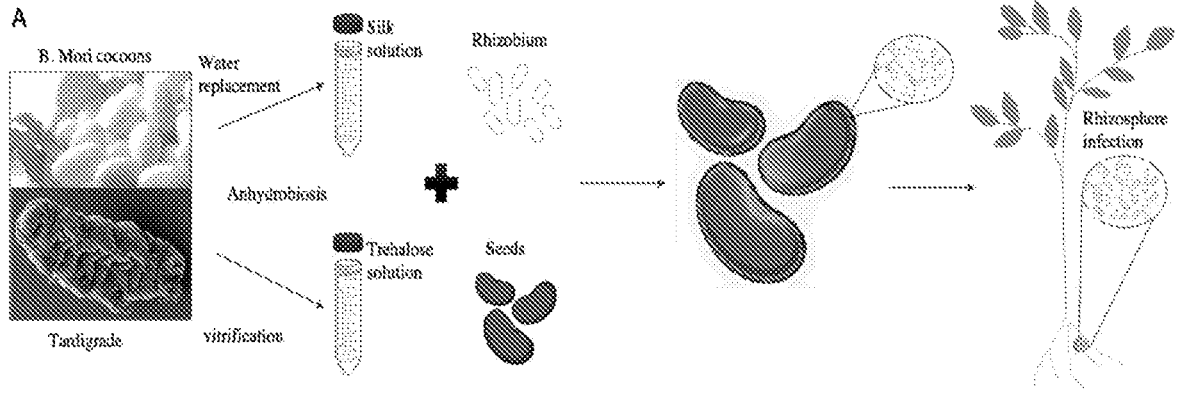
FIG. 5A shows a schematic of the strategy used to preserve and deliver CIAT 899 to induce roots infection through inoculation by seed coating of common beans.
Figure 5B:
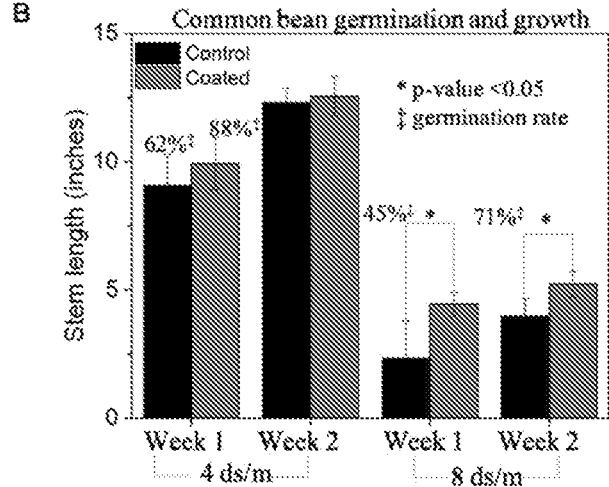
FIG. 5B shows the germination rate and stem growth over a 2-week period in non-saline (4 ds/m) and saline (8 ds/m) conditions.
Figure 5C:
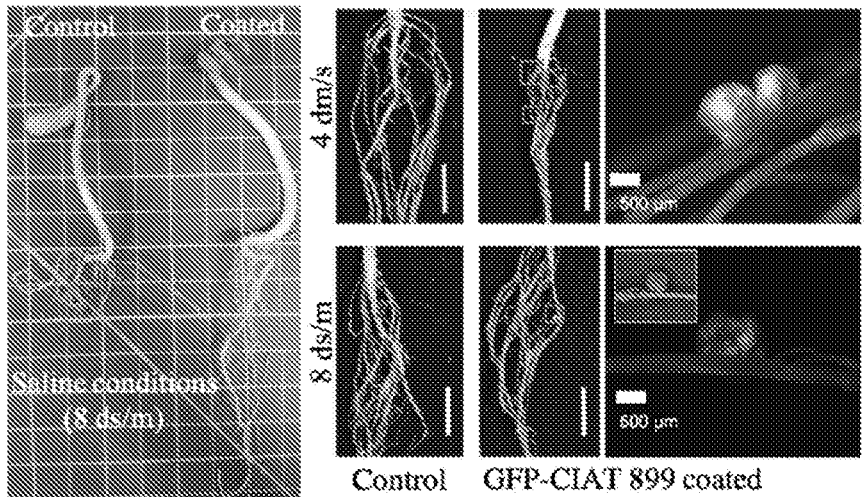
FIG. 5C shows macroscopic pictures and fluorescence microscope images of root nodulation confirmed root colonization by GFP-CIAT 899. Scale bar in root images is 1 cm. P. vulgaris planted per condition, n=15.
Figure 6:
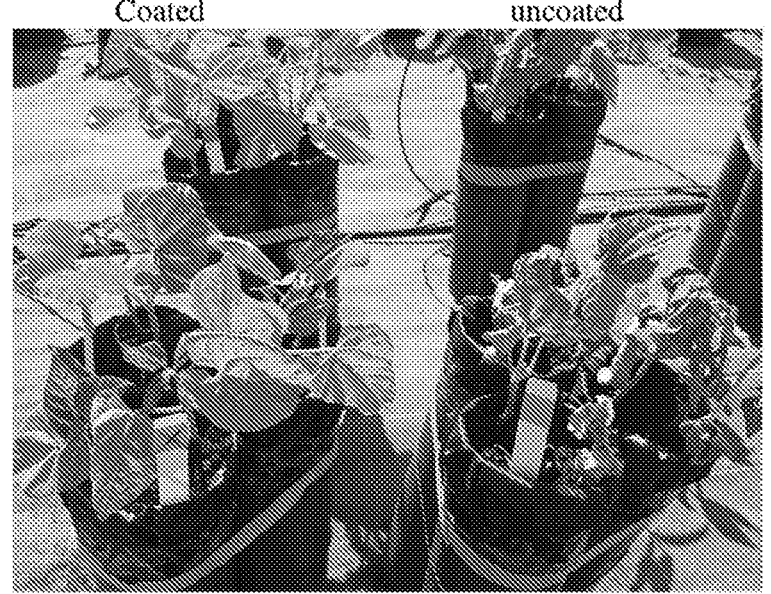
FIG. 6 illustrates seeds planted in saline soil (50 mM) in Morocco. Coated seeds are on the left and control seeds are on the right.
Figure 6:
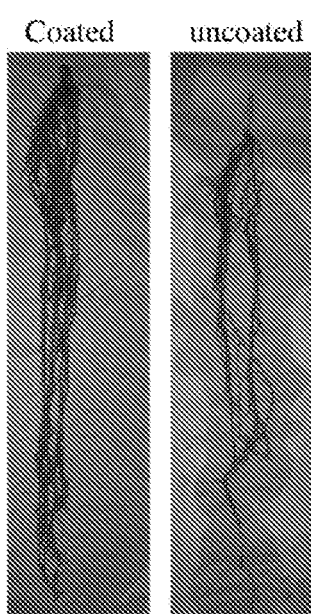
Figure 7A:
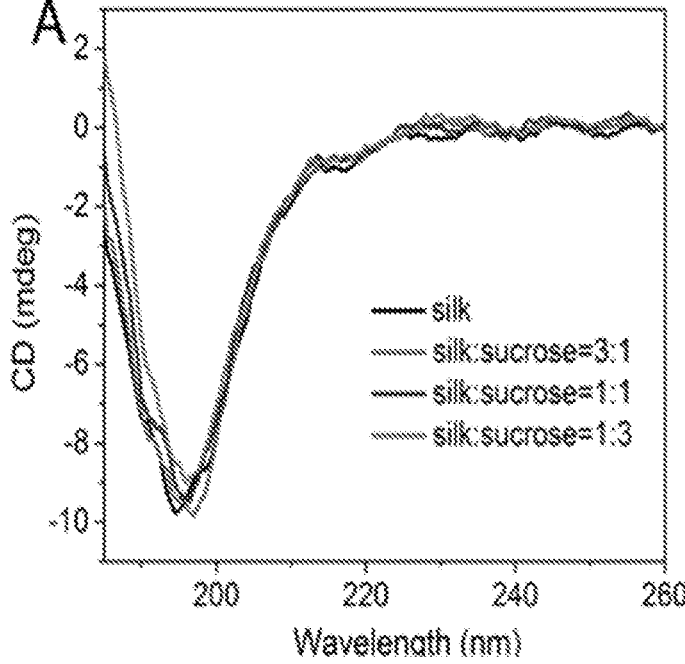
FIG. 7A shows a CD of air-dried films.
Figure 7B:
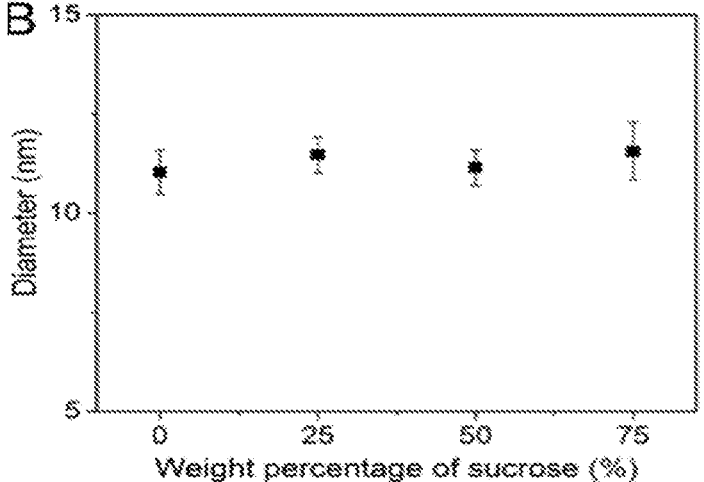
FIG. 7B shows DLS intensity average diameter.
Figure 7C:
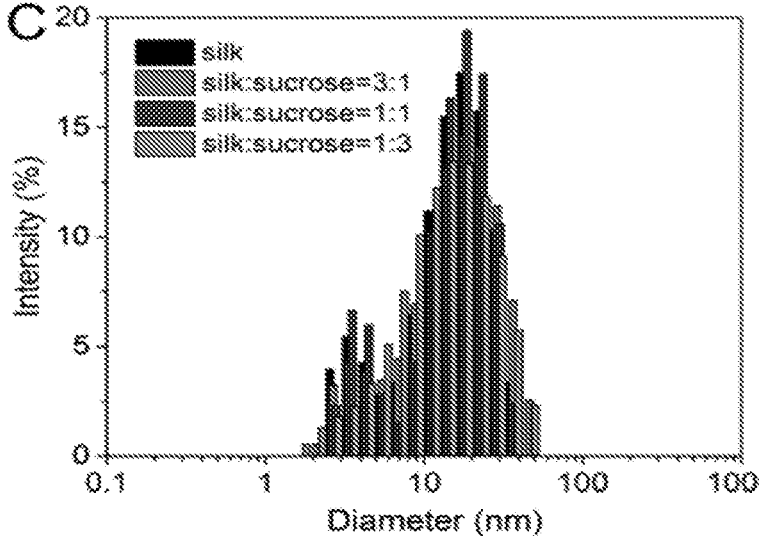
FIG. 7C shows DLS size distribution.
Figure 7D:
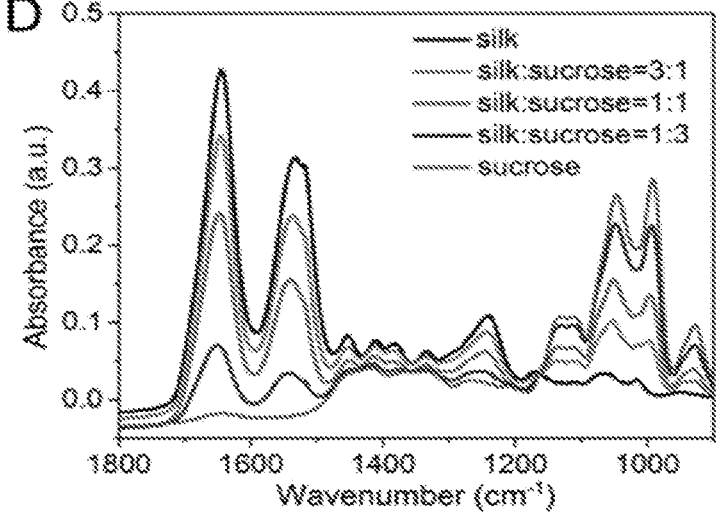
FIG. 7D shows FTIR spectra of films.
Figure 7D:
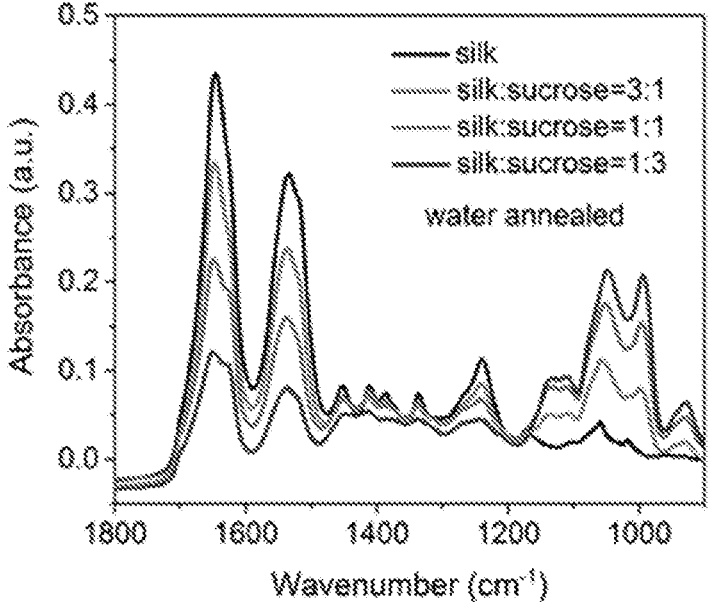
Figures 7E, 7F:
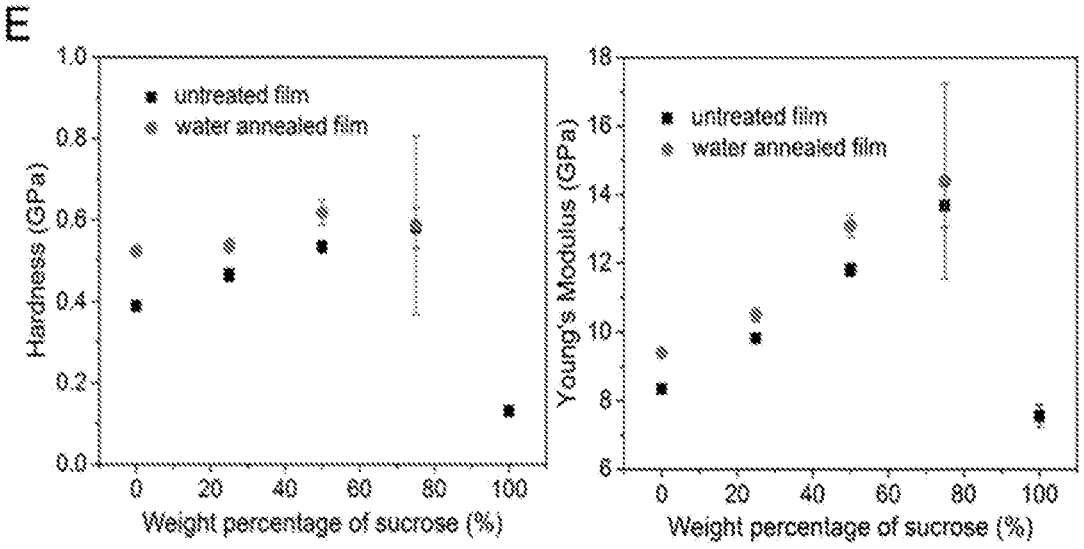
FIG. 7E shows mechanical properties of films using nanoindentation.
FIG. 7F shows contact angle and viscosity table of solutions. S=silk, C=sucrose, SC(3:1)=silk:sucrose=3:1.

*P. vulgaris* seeds were dip coated with ST(1:3) encapsulating CIAT 899, dried and stored for 24 hours before planting (FIG. 5A). Among all the materials investigated, ST(1:3) mixture ratio was used given its superior performance in terms of mechanical properties, solution viscosity and CIAT 899 preservation. Coating processing was designed to coat each seed with 107 CIAT 899 bacteria, following specifications generally imposed by policy makers for biofertilizers (45). CIAT 899-coated *P. vulgaris* were grown over a two week period of time in saline (8 ds/m) and non-saline (4 ds/m) soil, using ST(1:3)-coated seeds with no CIAT 899 as control. Saline soil was obtained adding NaCl to topsoil. The CIAT 899-coated *P. vulgaris* seeds had a statistically significant improved germination rate in 4 ds/m and 8 ds/m soils when compared to the control seeds. Over the two-week period investigated, the CIAT 899-coated *P. vulgaris* seed grew in seedlings that were taller and possessed longer and more articulated roots when compared to the control seeds (FIG. 5B). Visual inspection and fluorescent microscopy were used to assess nodule formation. The right panel of FIG. 5B depicts how the GFP-CIAT 899-coated *P. vulgaris* seed germinated in plants that were colonized by GFP-CIAT 899, as indicated by the presence of nodules that possessed a strong GFP-induced fluorescence. Interestingly, the effectiveness of the CIAT 899-ST (1:3) coating in boost germination and yield stronger seedlings was more evident when germination occurred in 8 ds/m soil.

The rhizobium strain used herein survived encapsulation in the biomaterial coating, was preserved over time and was successfully released in the soil forming symbiotic nodules with the host roots.

Figure 12:
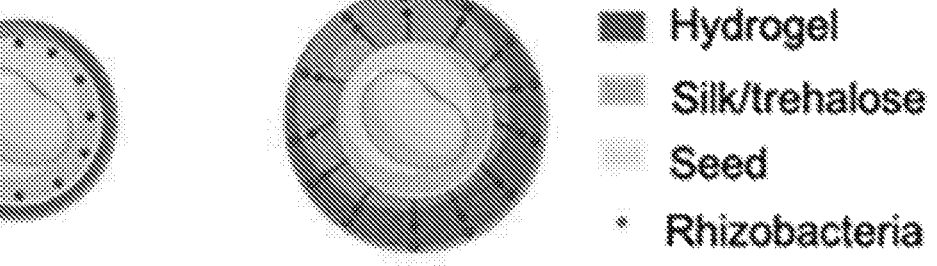
FIG. 12 is a schematic diagram of the coating design.

A schematic diagram of the coating design in shown in FIG. 12. A seed is coated with a biomaterial, such as silk/trehalose. The biomaterial can include bacteria such as rhizobacteria. The silk layer is coated with a hydrogel, such as one that comprises pectin, carboxymethyl cellulose (CMC), or a mixture of pectin and CMC.

FIG. 13 illustrates the mechanism of operation. A first layer includes a silk/trehalose base layer which preserves microbes in a dry state. A second layer includes a hydrogel, such as a pectin/CMC layer, which resuscitates microbes and improves germination in dry arid conditions. The hydrogel can be superabsorbent. The hydrogel absorbs water to hydrate and initiate germination. The microbe base coating dissolves and microbes diffusive into the (superabsorbent) hydrogel layer. Sugars in the hydrogel layer provide nutrients for resuscitation and proliferation. This provides gradual localized controlled microbe release. The seed releases exudates to chemoattract *Rhizobium tropici*. Root and cortex fissures are colonized by microbes. The coating gradually biodegrades and is penetrated by the root system.

EXAMPLES

Materials and Methods

MD simulation—The initial model for the $(GAGSGA)_2$ oligomer was constructed by threading the dodecapeptide sequence onto the structure of a poly-(Gly-Ala) b-sheet (Protein Data Bank identification code 2slk) using UCSF Chimera and Modeller. The system was then equilibrated in a transferable intermolecular potential 3P (TIP3P) explicit water box. Simulations were run for 40 ns with a time-step of 2 fs at constant temperature (300 K) and pressure (1 bar) using GROMACS. The force field used was GROMOS53a6. Alpha,alpha-Trehalose structure was provided by the Automated Topology Builder (ATB) and Repository available from the Molecular Dynamics Group at the University of Queensland, QLD, Australia. The stability of the β-sheet assembly was verified from hydrogen-bond dynamics and root mean squared deviation (RMSD) data obtained from the molecular dynamics' trajectory.

Materials fabrication—To investigate biopolymer preservation mechanism, films were fabricated via drop casting and spray drying. Suspensions were made of gram negative PGPRs (*Rhizobium tropici* CIAT 899 Martinez-Romero et al. —ATCC 49672) mixed with the silk fibroin, trehalose or silk fibroin-trehalose (ST) mixtures. NaCl solution was used as a negative control. Alamar Blue metabolic assay and agar streaking were used to evaluate bacteria viability upon resuscitation. Biopolymer solutions at a concentration of 1 dry wt % solution were prepared for consistency throughout the manuscript. Silk fibroin aqueous suspensions were prepared as described in "Materials fabrication of Bombxy silk". Trehalose (TCI America, Portland, OR, USA), poly-vinylpyrrolidone (PVP, 30 kDa) (Sigma Aldrich, St Louis, MO, USA), methyl cellulose (Sigma Aldrich, St Louis, MO) and NaCl (Sigma Aldrich, St Louis, MO) were all dissolved in $H_2O$. However, for methyl cellulose the $H_2O$ had to be cooled at 4° C. for mixing to occur. For bacteria handling and culture, 50% tryptic Soy Broth (Becton Dickinson, Franklin Lakes, NJ, USA) was generated by mixing 500 ml of $H_2O$ with 7.5 g BD™ Tryptic Soy broth (Soybean-Casein Digest Medium) (Becton Dickinson, Franklin Lakes, NJ, USA). The media was autoclaved for 60 min at 121° C. CIAT 899 was sourced and cultured in a shaker incubator at 200 rpm and 30° C. up to an OD600 measure of 0.7. Once bacteria reached an OD600 of 0.7, 11 ml of bacteria broth solution was centrifuged at 4300 rpm for 20 min. The bacteria formed a pellet and the supernatant was discarded. Concentrated bacteria suspension was made, 1.1 ml of biopolymer was pipetted into the pelleted bacteria strain and uniformly mixed by thoroughly pipetting up and down. This was carried out for all biopolymers used. These were labeled as live samples. For the dead samples, used as negative control, the bacteria pellet was mixed with 70% (w/v) isopropanol and incubated for 60 min. After the 60 min the bacteria solution was centrifuged as above and supernatant discarded. Concentrated bacteria suspension was made, 1.1 ml of biopolymer was pipetted into the pelleted bacteria and uniformly mixed by thoroughly pipetting up and down. This was carried out for all biopolymers used. 5 repeats of 100 μl of live and dead samples were produced for each time point. Bacteria-biopolymer suspensions were drop cast onto 1" by 1" PDMS slab and left to air-dry. Films were then preserved at room temperature for a period of time in petri dishes. Samples that were subjected to water annealing were placed in a vacuum chamber with $H_2O$, sealed for 6 hours to anneal, removed and placed in petri dishes.

Live dead assay—To develop calibration curve of alamar Blue assay (Resazurin), the following procedure was followed: (i) OD600=0.7 bacteria solution was collected and centrifuged. (ii) For negative control (dead bacteria), centrifuged bacteria were resuspended into 1 ml of 70% isopropanol (Sigma Aldrich, St Louis, MO, USA) for 60 min., then centrifuged and resuspended into 1 ml of NaCl. (iii) The bacteria suspension obtained at point (i) was centrifuged and resuspended in NaCl (live bacteria). (iv) Dead and live bacteria were mixed in increasing relative concentration to form the following ratios: 100% live, 80:20 live:dead, 50:50 live:dead, 20:80 live:dead and 100% dead and the relative OD600 was measured (v) 100 μl of the above suspensions were added to 96 well plate and viability was measured. To measure viability an alamar Blue assay was performed following the manufacturer protocol. The excitation wavelength was 570 nm and emission wavelength 585 nm. Samples were prepared in the dark and kept under wrap of foil paper for 60 minutes before the analysis was performed. Alamar Blue assay microplate reader (Tecan Safire 2, Mannedorf, Switzerland) gain was kept constant for all experiments performed.

Film degradation—Biopolymer films encapsulating GFP-CIAT 899 were placed in contact with 1 cm thin phytagel films (artificial soil) and time-dependent degradation was studied with the ChemiDoc MP Imager (Bio-rad, Hercules, CA) at GFP emission and excitation. Phytagel gel (Sigma Aldrich, St Louis, MO) was made by following protocol from Sigma Aldrich by mixing 2 g/l phytagel and 1.5% $CaCl_2$ in water solution. Further, film degradation was studied under fluorescence microscopy and videoed (Movie S1). Phytagel films were placed above air-dried films.

DLS—Dynamic Light Scattering (DLS) measurements were performed on a DynaPro NanoStar Light Scatterer (Wyatt Technology). Samples at 0.1 mg/ml were measured in plastic cuvettes (UVette, Eppendorf). The laser was set at 658 nm. The acquisition time for each data point was 5 seconds, and ten data points were acquired for each sample.

CD—Circular Dichroism (CD) spectra were recorded from 185 to 260 nm using a JASCO J-1500 spectrometer, with each spectrum averaged from three consecutive scans. Samples of concentrations higher than 0.1 mg/ml were diluted to 0.1 mg/ml with the corresponding buffer and measured in a 1 mm path length quartz cuvette (Starna Cells, Inc.).

FTIR—Drop cast films were analyzed using Thermo Fisher FTIR6700 Fourier Transform Infrared Spectrometer through attenuated total reflection (ATR) germanium crystal. For each sample, 64 scans were coadded with a resolution of 4 cm$^{-1}$, at wave numbers between 4000 and 650 cm$^{-1}$. The background spectra were collected under the same conditions and subtracted from the scan for each sample.

SEM—Drop cast films were freeze cracked after being dipped in liquid nitrogen and analyzed with a Zeiss Merlin High-resolution scanning electron microscope. Samples prepared did not charge, therefore no gold plating or any preparation of samples was performed. An EHT of 1.00 kv was used with a 100 pA probe.

Nanoindentation—Nanoindentaion measurements were performed on a Hysitron TriboIndenter with a nanoDMA transducer (Bruker). Samples were indented in load control mode with a peak force of 500 μN and a standard load-peak hold-unload function. Reduced modulus was calculated by fitting the unloading data (with upper and lower limits being 95% and 20%, respectively) using the Oliver-Pharr method and converted to Young's modulus assuming a Poisson's ratio of 0.33 for all samples. Each type of sample was prepared and indented in triplets to ensure good fabrication repeatability. For each sample, indentation was performed at a total of 49 points (7×7 grid with an increment of 20 μm in both directions) to ensure statistical reliability of the modulus measurements.

Viscosity—Rheological measurements were performed on 6 dry wt % biopolymer suspensions using a TA Instruments (New Castle, DE, USA) stress-controlled AR-G2 rheometer with a 60 mm, 2° cone-and-plate fixture at 25° C. Solutions were allowed to equilibrate on the rheometer before running stepped flow from 0.1000 l/s to 1000 l/s.

Contact angle measurement—Contact angle analysis was performed using an optical contact angle apparatus Ramehart goniometer (Succasunna, NJ, USA) equipped with a video measuring system with a high-resolution CCD camera and a high-performance digitizing adapter. SCA 20 software (Data Physics Instruments GmbH, Filderstadt, Germany) was used for data acquisition. Soda lime glass slides were fixed and kept flat throughout the analysis. The contact angle of silk fibroin, trehalose and their mixtures was measured by the sessile drop method by gently placing a droplet of 5 μl of biopolymer suspension onto the seed surface, according to the so-called pick-up procedure. All droplets were released from a height of 1 cm above the surface to ensure consistency between each measurement. The contact angle (θ, the angle between the baseline of the drop and the tangent at the drop boundary) was monitored using a software-assisted image-processing procedure. Five droplets were examined for the different biopolymer formulations considered on both the left and right sides and the resulting mean θ values were used.

Seed coating—*Phaseolus vulgaris* seeds were surface sterilized with 50% bleach for 3 minutes, rinsed in $H_2O$ three times and left to air dry. GFP-CIAT 899 was grown overnight to an OD600 measurement of 1.80 ml of GFP-CIAT 899 was centrifuged at 4200 rpm in a Eppendorf (Hamburg, Germany) centrifuge 5910 R. The supernatant was discarded and 8 ml of 6 dry wt % silk fibroin-trehalose (1:3) suspension was added to the spun down GFP-CIAT 899. Air-dried seeds were then dipped into this solution for 120 seconds, taken out and left to dry. After drying, the seeds were planted at the 24-hour mark. When water annealing post-processing was applied, seeds were placed in a vacuum chamber with $H_2O$, sealed for 6 hours to anneal and planted at the 24-hour point.

Encapsulation of bacteria on seed models—50 seed models made by borosilicate glass beads (diameter=5 mm, VWR, Radnor, PA, USA) were coated and air-dried. Once coatings dried, the glass beads were dropped into a measuring tube with 20 ml of 1× phosphate buffer solution (Thermo Fisher scientific, Waltham, MA, USA). The solution was mixed, diluted and plated on agar plates for colony counting. For glass bead fluorescence imaging, beads were imaged under UV light and glass bead fluorescence imaged for the following conditions: uncoated, dip coated with silk fibroin, dip coated with silk fibroin and GFP-CIAT 899 and spray dried with silk fibroin and GFP-CIAT 899. The glass beads were left to air-dry.

Planting—Twelve square pots per experimental run were used and two seeds planted per pot. Four experimental runs were conducted with control (surface sterilized seeds) and GFP-CIAT 899 coated seeds. Two conditions were used, non-saline (4 ds/m) and saline (8 ds/m). Artificial salinity was created by adding 12 g of NaCl into 1.2 litres of water, which was then mixed with 650 g of soil. Salinity was measured with a salinity meter. The plants were then watered every other 3rd day. Plant heights and root lengths were then recorded at week 1 and week 2 after germination.

Fluorescence microscopy—Root nodules were imaged under GFP fluorescence with a Nikon Eclipse TE2000-E to confirm GFP-CIAT 899 root nodulation.

It should be understood that the subject matter defined in the appended claims is not necessarily limited to the specific implementations described above. The specific implementations described above are disclosed as examples only.

BIBLIOGRAPHY

References

1. Food and Agriculture Organization of the United Nations (2019) *The State of Food Security and Nutrition in the World*. http://www.fao.org/3/ca5162en/ca5162en.pdf
2. Godfray H C J, et al. (2010) Food security: The challenge of feeding 9 billion people. *Science* (80-)327(5967):812-818.
3. Gebbers R, Adamchuk V I (2010) Precision agriculture and food security. *Science* (80-) 327(5967):828-831.
4. Gomiero T (2016) Soil degradation, land scarcity and food security: Reviewing a complex challenge. *Sustain* 8(3):1-41.
5. Pedrini S, Merritt D J, Stevens J, Dixon K (2017) Seed Coating: Science or Marketing Spin? *Trends Plant Sci* 22(2):106-116.
6. Copeland L O, McDonald M (2001) *Principles of Seed Science and Technology* (Springer US). 4th Ed. doi: 10.1007/978-1-4615-1619-4.
7. Taylor A G, et al. (1998) Seed enhancements. *Seed Sci Res* 8(2):245-256.
8. Deaker R, Roughley R J, Kennedy I R (2004) Legume seed inoculation technology—a review. *Soil Biol Biochem* 36(8):1275-1288.
9. Lugtenberg B, Kamilova F (2009) Plant-growth-promoting rhizobacteria. *Annu Rev Microbiol* 63:541-556.
10. Vessey J K (2003) Plant growth promoting rhizobacteria as biofertilizers. *Plant Soil* 55(2):571-586.
11. Bulgarelli D, Schlaeppi K, Spaepen S, Van Themaat E V L, Schulze-Lefert P (2013) Structure and functions of the bacterial microbiota of plants. *Annu Rev Plant Biol* 64:807-838.

12. O'Callaghan M, O'Callaghan M (2016) Microbial inoculation of seed for improved crop performance: issues and opportunities. *Appl Microbiol Biotechnol* 100(13): 5729-5746.
13. Holland C, Numata K, Rnjak-Kovacina J, Seib F P (2019) The Biomedical Use of Silk: Past, Present, Future. *Adv Healthc Mater* 8(1):1800465.
14. Zhou Z, et al. (2018) Engineering the Future of Silk Materials through Advanced Manufacturing. *Adv Mater* 30(33):1706983.
15. Rockwood D N, et al. (2011) Materials fabrication from *Bombyx mori* silk fibroin. *Nat Protoc* 6(10):1612-1631.
16. Tseng P, et al. (2017) Directed assembly of bio-inspired hierarchical materials with controlled nanofibrillar architectures. *Nat Nanotechnol* 12(5).
17. Matsumoto A, Lindsay A, Abedian B, Kaplan D L (2008) Silk Fibroin Solution Properties Related to Assembly and Structure. *Macromol Biosci* 8(11):1006-1018.
18. Marelli B, Brenckle M A, Kaplan D L, Omenetto F G (2016) Silk Fibroin as Edible Coating for Perishable Food Preservation. *Sci Rep* 6.
19. Omenetto F G, Kaplan D L (2010) New Opportunities for an Ancient Material. *Science* (80-) 329 (5991):528 LP-531.
20. Jin H-J, Kaplan D L (2003) Mechanism of silk processing in insects and spiders. Nature 424(6952):1057-1061.
21. Pritchard E M, Kaplan D L (2011) Silk fibroin biomaterials for controlled release drug delivery. *Expert Opin Drug Deliv* 8(6):797-811.
22. Crowe J H, Hoekstra F A, Crowe L M (1992) Anhydrobiosis. *Annu Rev Physiol* 54:579-599.
23. Ohtake S, Wang Y J (2011) Trehalose: Current Use and Future Applications. *J Pharm Sci* 100(6):2020-2053.
24. Crowe J H, Carpenter J F, Crowe L M (1998) The role of vitrification in anhydrobiosis. *Annu Rev Physiol* 60(1): 73-103.
25. Crowe J H, Crowe L M, Chapman D (1984) Preservation of membranes in anhydrobiotic organisms: the role of trehalose. *Science* 223(4637):701-3.
26. Jain N K, Roy I (2009) Effect of trehalose on protein structure. *Protein Sci* 18(1):24-36.
27. Boothby T C, et al. (2017) Tardigrades Use Intrinsically Disordered Proteins to Survive Desiccation. *Mol Cell* 65(6):975-984.e5.
28. Li A B, Kluge J A, Guziewicz N A, Omenetto F G, Kaplan D L (2015) Silk-based stabilization of biomacromolecules. *J Control Release* 219:416-430.
29. Lerbret A, Bordat P, Affouard F, Descamps M, Migliardo F (2005) How Homogeneous Are the Trehalose, Maltose, and Sucrose Water Solutions? An Insight from Molecular Dynamics Simulations. *J Phys Chem B* 109(21):11046-11057.
30. Williams S H, Wright B W, Truong V den, Daubert C R, Vinyard C J (2005) Mechanical properties of foods used in experimental studies of primate masticatory function. *Am J Primatol* 67(3):329-346.
31. Tao H, et al. (2015) Inkjet Printing of Regenerated Silk Fibroin: From Printable Forms to Printable Functions. *Adv Mater* 27(29).
32. Martinez-Romero E, et al. (1991) *Rhizobium tropici*, a Novel Species Nodulating *Phaseolus vulgaris* L. Beans and *Leucaena* sp. Trees. *Int J Syst Evol Microbiol* 41(3): 417-426.
33. Hungria M, et al. (2000) Isolation and characterization of new efficient and competitive bean (*Phaseolus vulgaris* L.) rhizobia from Brazil. *Soil Biol Biochem* 32(11):1515-1528.

34. Hungria M, Campo R J, Mendes I C (2003) Benefits of inoculation of the common bean (*Phaseolus vulgaris*) crop with efficient and competitive *Rhizobium tropici* strains. *Biol Fertil Soils* 39(2):88-93.

35. Vriezen J A C, de Bruijn F J, Nusslein K (2007) Responses of *Rhizobia* to Desiccation in Relation to Osmotic Stress, Oxygen, and Temperature. *Appl Environ Microbiol* 73(11):3451 LP-3459.

36. Zaidi A, Ahmad E, Khan M S, Saif S, Rizvi A (2015) Role of plant growth promoting rhizobacteria in sustainable production of vegetables: Current perspective. *Sci Hortic* (Amsterdam) 193:231-239.

37. Sharma S B, Sayyed R Z, Trivedi M H, Gobi T A (2013) Phosphate solubilizing microbes: Sustainable approach for managing phosphorus deficiency in agricultural soils. *Springerplus* 2(1).

38. Kluge J A, et al. (2016) Silk-based blood stabilization for diagnostics. *Proc Natl Acad Sci* 113(21):5892 LP-5897.

39. Wenk E, Merkle H P, Meinel L (2011) Silk fibroin as a vehicle for drug delivery applications. *J Control Release* 150(2):128-141.

40. Hu X, et al. (2011) Regulation of Silk Material Structure by Temperature-Controlled Water Vapor Annealing. *Biomacromolecules* 12(5):1686-1696.

41. Vriezen J A, de Bruijn F J, Nusslein K R (2012) Desiccation induces viable but Non-Culturable cells in *Sinorhizobium meliloti* 1021. *AMB Express* 2(1):6.

42. Reina-Bueno M, et al. (2012) Role of trehalose in heat and desiccation tolerance in the soil bacterium *Rhizobium etli*. *BMC Microbiol* 12:207.

43. Fernandez-Aunion C, et al. (2010) Biosynthesis of compatible solutes in rhizobial strains isolated from *Phaseolus vulgaris* nodules in Tunisian fields. *BMC Microbiol* 10:192.

44. Ampomah O Y, et al. (2013) The thuEFGKAB Operon of *Rhizobia* and *Agrobacterium tumefaciens* Codes for Transport of Trehalose, Maltitol, and Isomers of Sucrose and Their Assimilation through the Formation of Their 3-Keto Derivatives.

45. Malusa E, Vassilev N (2014) A contribution to set a legal framework for biofertilisers. *Appl Microbiol Biotechnol* 98(15):6599-6607.

What is claimed is:

1. A biomaterial-based seed coating composition comprising:
   (a) a disaccharide and a structural protein, wherein the disaccharide is trehalose and the structural protein is silk fibroin, wherein the ratio of the structural protein to disaccharide is about 1:3; and
   (b) plant growth promoting rhizobacteria (PGPRs).

2. The composition of claim 1, wherein the silk fibroin is extracted from *Bombyx mori* cocoons.

3. The composition of claim 1, wherein the rhizobacteria is selected from the group consisting of the Rhizobium strain.

4. The composition of claim 3, wherein the rhizobacteria is *Rhizobium tropici* CIAT 899.

5. The composition of claim 1, further comprising a hydrogel.

6. The composition of claim 5, wherein the hydrogel comprises pectin, carboxymethyl cellulose (CMC), or a mixture of pectin and CMC.

7. The composition of claim 3, wherein the ratio of the structural protein to disaccharide is 1:3.

8. The composition of claim 5, wherein the ratio of the structural protein to disaccharide is 1:3.

9. The composition of claim 6, wherein the ratio of the structural protein to disaccharide is 1:3.

10. A plant seed coated with the composition of claim 1.

11. The plant seed of claim 10, wherein the rhizobacteria is selected from the group consisting of the Rhizobium strain.

12. The plant seed of claim 10, wherein the rhizobacteria is *Rhizobium tropici* CIAT 899.

13. A method of applying the biomaterial-based seed coating composition of claim 1 to the surface of a plant seed, by performing dip coating or spray drying.

14. A method of improving plant growth, the method comprising applying the biomaterial-based seed coating composition of claim 1 to a surface of a seed, and then germinating the seed for improved plant growth.

* * * * *